US012564985B2

(12) United States Patent (10) Patent No.: US 12,564,985 B2
Ishizawa et al. (45) Date of Patent: Mar. 3, 2026

(54) WORKING MACHINE

(71) Applicant: Makita Corporation, Anjo (JP)

(72) Inventors: Takumi Ishizawa, Anjo (JP); Sho Tsuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 182 days.

(21) Appl. No.: 18/342,156

(22) Filed: Jun. 27, 2023

(65) Prior Publication Data

US 2024/0009744 A1 Jan. 11, 2024

(30) Foreign Application Priority Data

Jul. 8, 2022 (JP) ................................. 2022-110410
Jul. 8, 2022 (JP) ................................. 2022-110414

(51) Int. Cl.
B23D 59/00 (2006.01)

(52) U.S. Cl.
CPC ................................. B23D 59/006 (2013.01)

(58) Field of Classification Search
CPC ..... A47L 7/0095; A47L 9/242; B23D 59/006; B23D 45/16; B23Q 11/0046; B24B 27/08; B24B 55/10; B24B 55/04; B27G 19/04; B28D 7/02; Y10T 83/0453
See application file for complete search history.

(56) References Cited

U.S. PATENT DOCUMENTS 1,833,785 A * 11/1931 Krieger ................ B23D 59/002
30/376
3,882,598 A * 5/1975 Earle .................... B23D 59/006
269/21

5,115,542 A * 5/1992 Gehres .................. F16L 3/2235
24/339
5,167,215 A * 12/1992 Harding, Jr. ....... B23Q 11/0046
83/100
5,540,616 A * 7/1996 Thayer ................. B24D 15/023
451/354
6,047,693 A * 4/2000 Yamami ............... B23D 59/006
30/124
6,219,922 B1 * 4/2001 Campbell ............ B23D 59/006
30/390

(Continued)

FOREIGN PATENT DOCUMENTS

CN          207414475 U      5/2018
CN          210820258 U      6/2020
DE            4117496 A1 * 12/1992
DE      102014212398 A1 * 12/2015 ............. B24B 55/06

(Continued)

OTHER PUBLICATIONS

DE_102014212398_A1 (Year: 2014).*

(Continued)

*Primary Examiner* — Jonathan G Riley

(74) *Attorney, Agent, or Firm* — Sughrue Mion, PLLC

(57) ABSTRACT

A working machine may include: a prime mover; a housing that houses the prime mover; a cutting part configured to be driven by the prime mover and cut an object; a dust collecting hose for collecting dust generated by the cutting part cutting the object; and a hose holding member configured to hold the dust collecting hose. The hose holding member may be attached to the housing so as to be swingable about a swing axis.

9 Claims, 18 Drawing Sheets

(56)      References Cited

U.S. PATENT DOCUMENTS

| | | | | |
|---|---|---|---|---|
| 6,546,631 | B2 * | 4/2003 | Iida | B23D 45/16 |
| | | | | 30/124 |
| 7,520,276 | B2 * | 4/2009 | Jakobsson | B28D 1/04 |
| | | | | 451/344 |
| 8,061,044 | B2 * | 11/2011 | Saitoh | B24B 55/102 |
| | | | | 30/124 |
| 9,033,769 | B2 * | 5/2015 | Mizutani | B23Q 11/0046 |
| | | | | 451/456 |
| 2004/0157540 | A1 | 8/2004 | Wendt et al. | |
| 2008/0060631 | A1 * | 3/2008 | Dofher | B28D 7/02 |
| | | | | 83/100 |
| 2013/0213681 | A1 | 8/2013 | Ikuta et al. | |
| 2018/0257157 | A1 * | 9/2018 | Guth | B23D 59/006 |
| 2022/0003345 | A1 | 1/2022 | Sonntag et al. | |
| 2023/0003327 | A1 * | 1/2023 | Terpstra | B25F 5/00 |
| 2023/0414048 | A1 * | 12/2023 | Gerold | A47L 9/248 |

FOREIGN PATENT DOCUMENTS

| | | | |
|---|---|---|---|
| JP | H01-097427 | A | 4/1989 |
| JP | H06-262428 | A | 9/1994 |
| JP | 2002-018810 | A | 1/2002 |
| JP | 2009-264296 | A | 11/2009 |
| JP | 2019-136984 | A | 8/2019 |
| JP | 3232881 | U | 7/2021 |
| WO | 2012/005225 | A1 | 1/2012 |

OTHER PUBLICATIONS

DE_4117496_A1 (Year: 1992).*
Japanese Office Action dated Dec. 2, 2025, issued in Japanese application No. 2022-110414.
Communication dated Jan. 6, 2025 in Japanese Application No. 2022-110410.

* cited by examiner

UP

FRONT ←——→ REAR

DOWN

WORKING MACHINE

REFERENCE TO RELATED APPLICATIONS

This application claims priority to Japanese Patent Application No. 2022-110410, filed on Jul. 8, 2022 and Japanese Patent Application No. 2022-110414, filed on Jul. 8, 2022, the entire contents of which are hereby incorporated by reference into the present application.

TECHNICAL FIELD

This disclosure herewith relates to working machines.

BACKGROUND ART

Japanese Patent Application Publication No. H01-097427 describes a working machine. The working machine includes a prime mover, a housing that houses the prime mover, an electric blower configured to be driven by the prime mover, a dust collecting hose for collecting dust on a floor by the blower, and a hose holding member configured to hold the dust collecting hose. The hose holding member is immovably attached to the housing.

DESCRIPTION

With a hose holding member as the one described above, when the orientation of the working machine is changed, a force may be applied to the hose holding member from the dust collecting hose and the hose holding member may thereby be damaged since the hose holding member is immovable with respect to the housing. The disclosure herein provides technologies that suppress damage to a hose holding member.

A working machine disclosed herein may comprise a prime mover; a housing that houses the prime mover; a cutting part configured to be driven by the prime mover and cut an object; a dust collecting hose for collecting dust generated by the cutting part cutting the object; and a hose holding member configured to hold the dust collecting hose. The hose holding member may be attached to the housing so as to be swingable about a swing axis.

According to the configuration above, when the orientation of the working machine is changed, the hose holding member swings with respect to the housing, which reduces a force applied from the dust collecting hose to the hose holding member. Thus, damage to the hose holding member can be suppressed.

Figure 3:
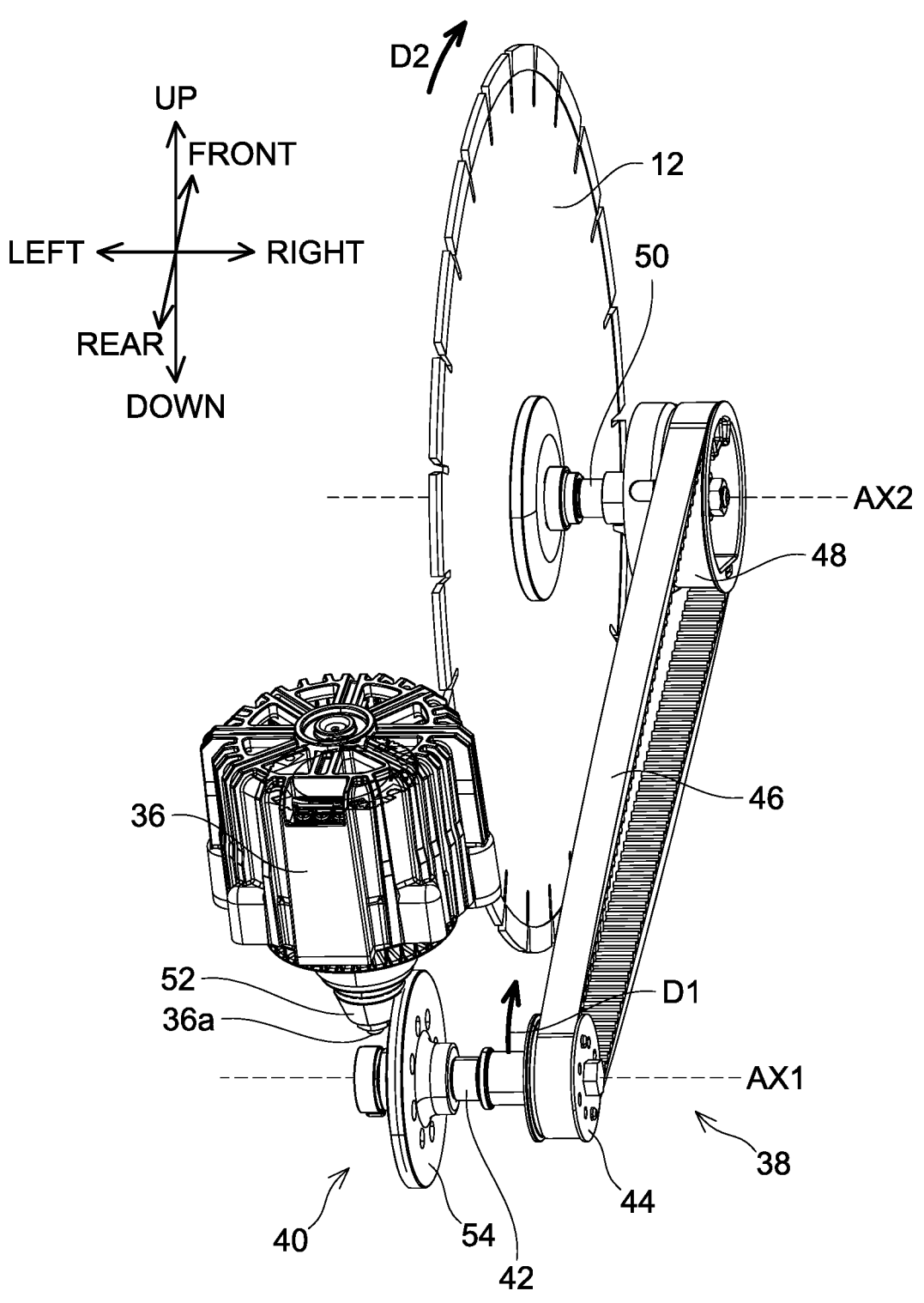

FIG. 3 is a perspective view of a cutter 12, a prime mover 36, and a transmission unit 38 according to the first embodiment.

Figure 4:
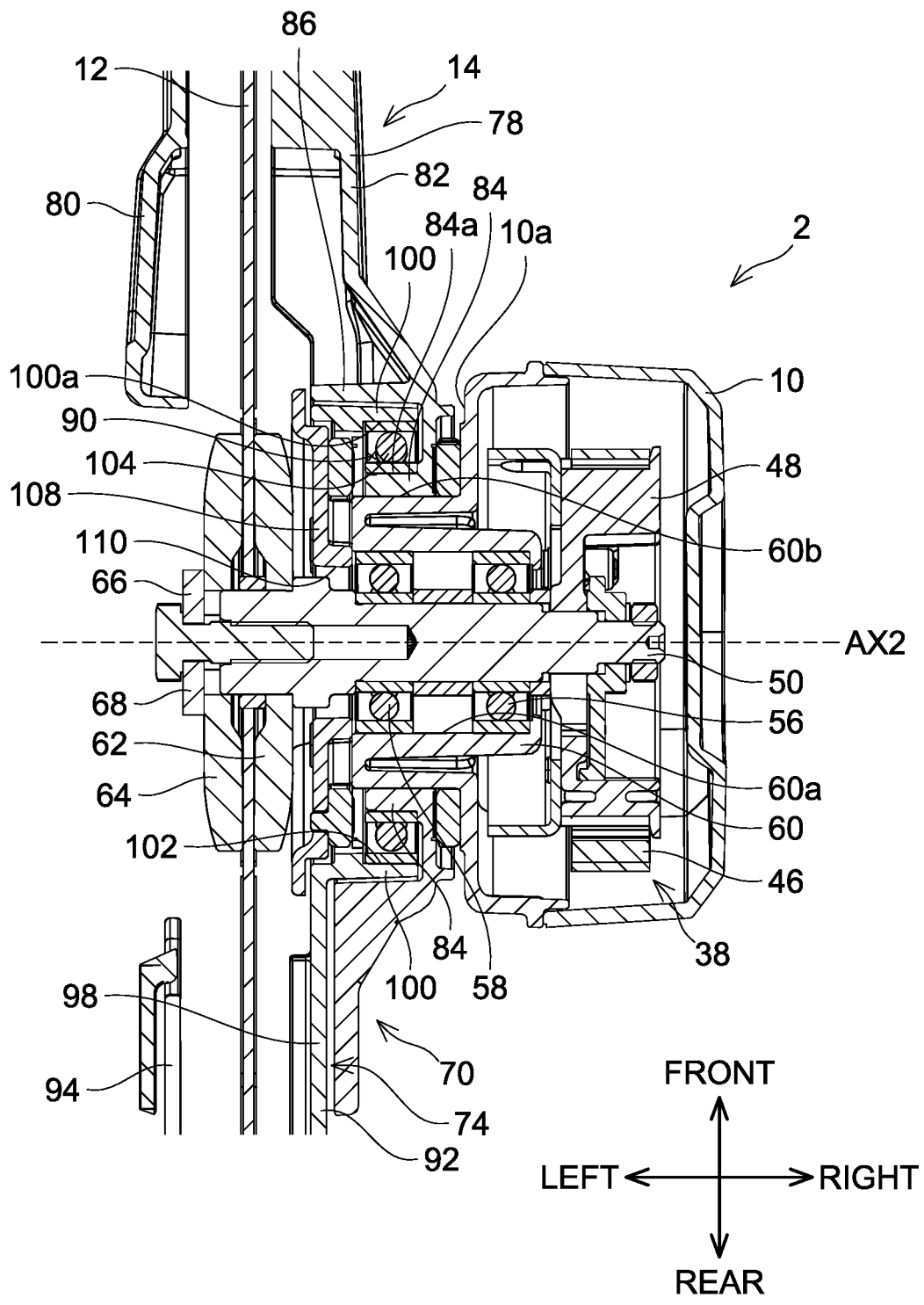

FIG. 4 is a cross-sectional view of the working machine 2 according to the first embodiment, in the vicinity of an output shaft 50.

Figure 5:
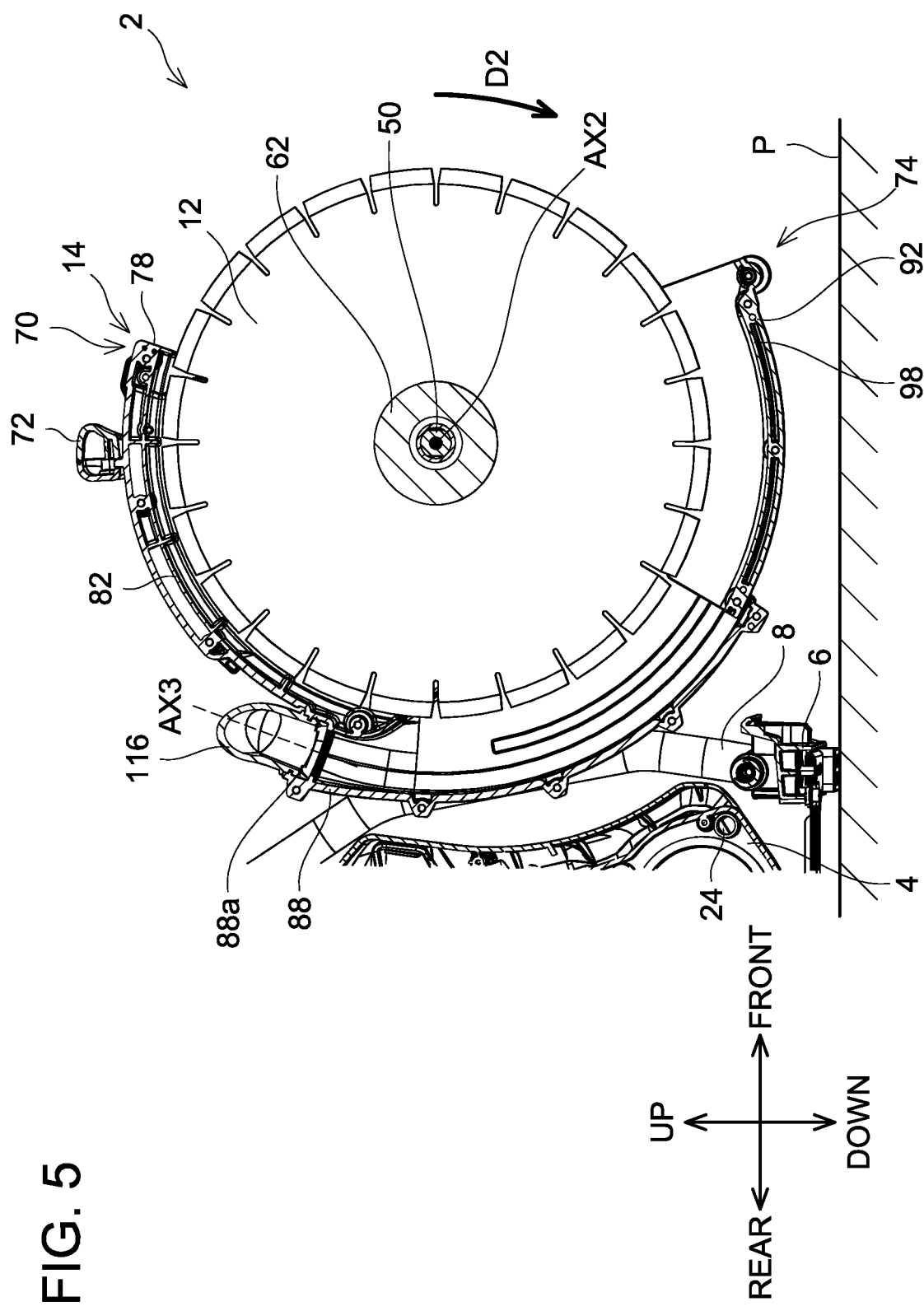

FIG. 5 is a cross-sectional view of the working machine 2 according to the first embodiment, in the vicinity of a cover unit 14.

Figure 6:
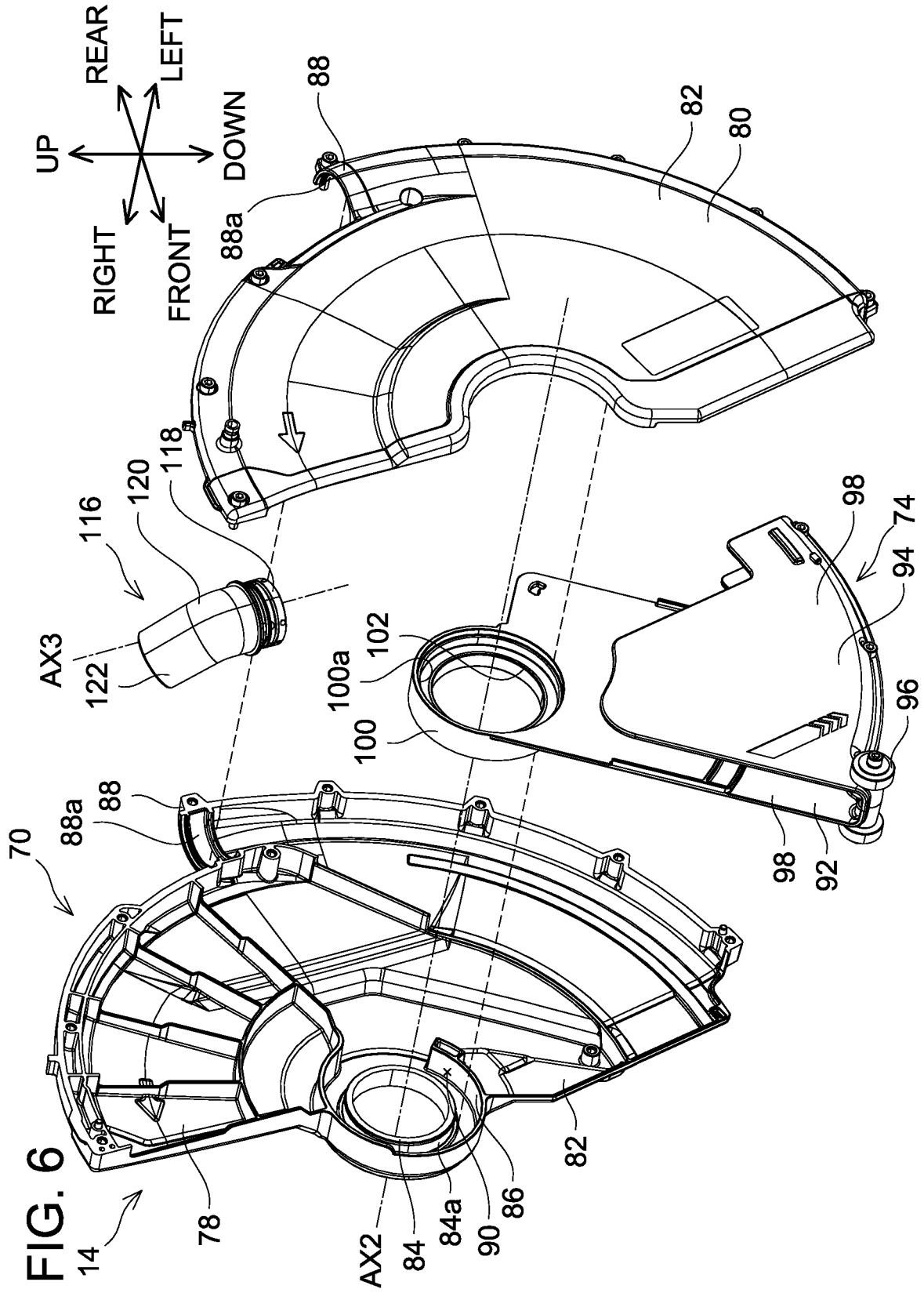

FIG. 6 is an exploded perspective view of the cover unit 14 according to the first embodiment.

Figure 7:
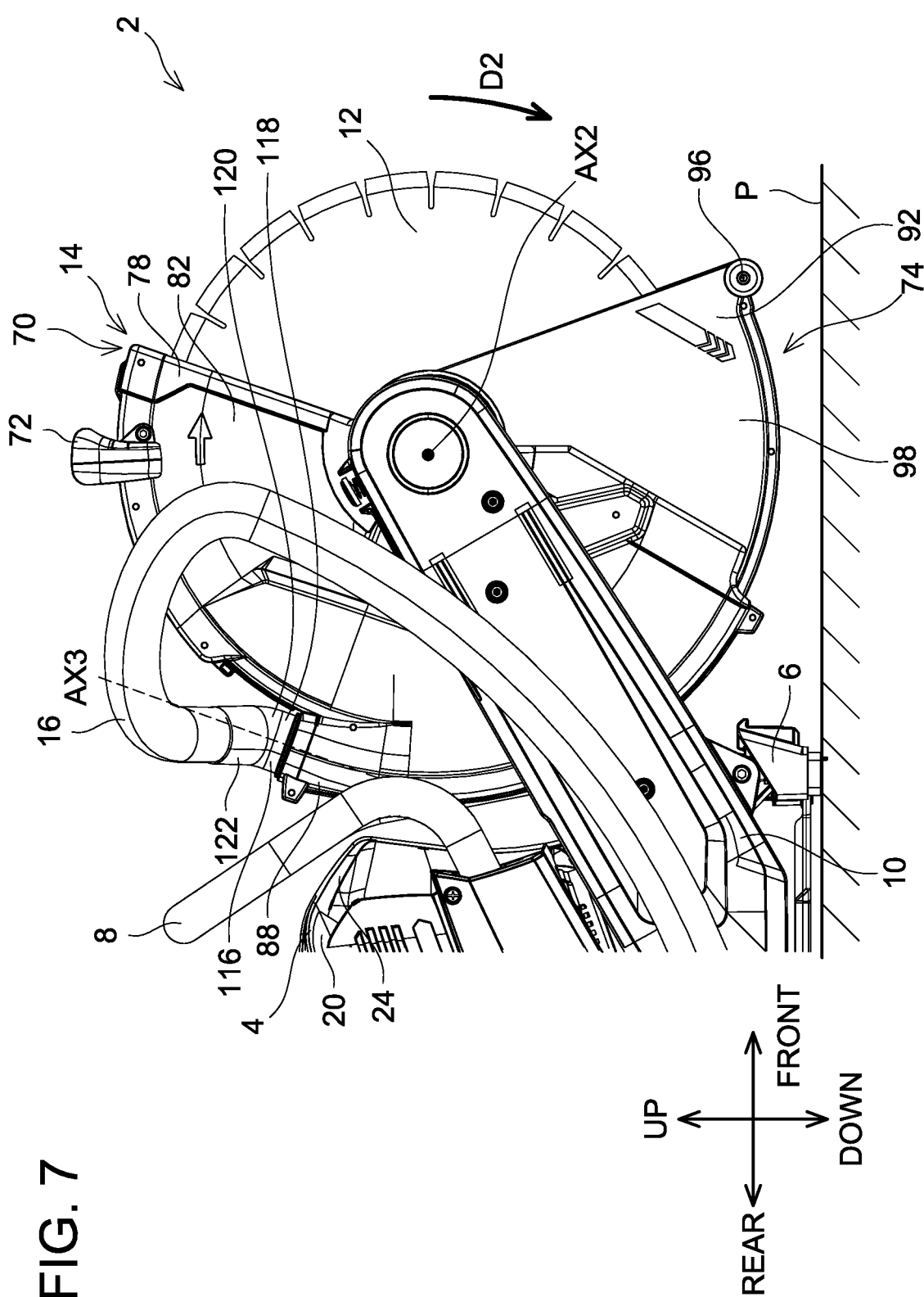

FIG. 7 is a side view of the working machine 2 according to the first embodiment, with a second movable cover 74 drawn from a first movable cover 70.

Figure 8:
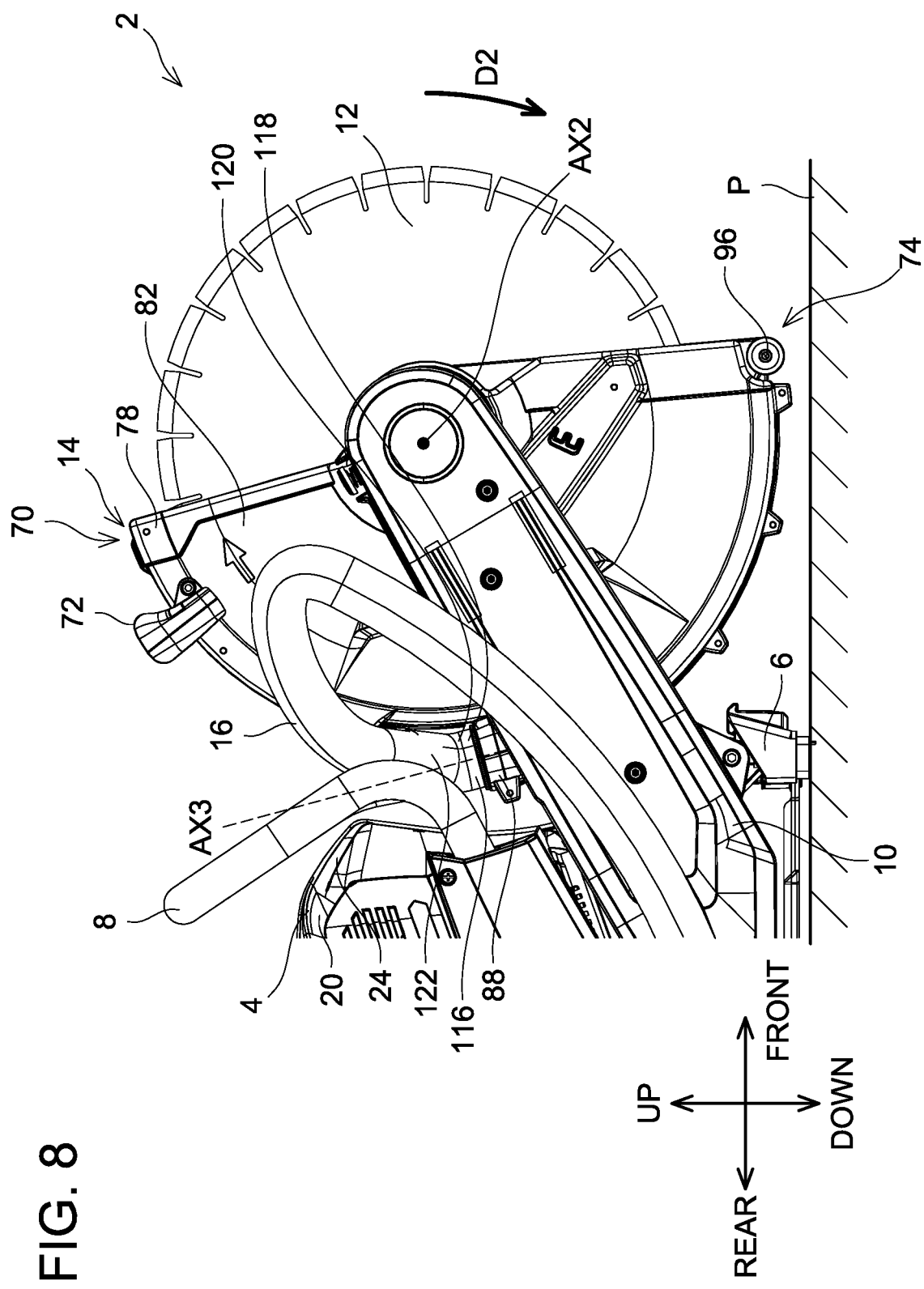

FIG. 8 is a side view of the working machine 2 according to the first embodiment, with the second movable cover 74 housed in the first movable cover 70.

Figure 9:
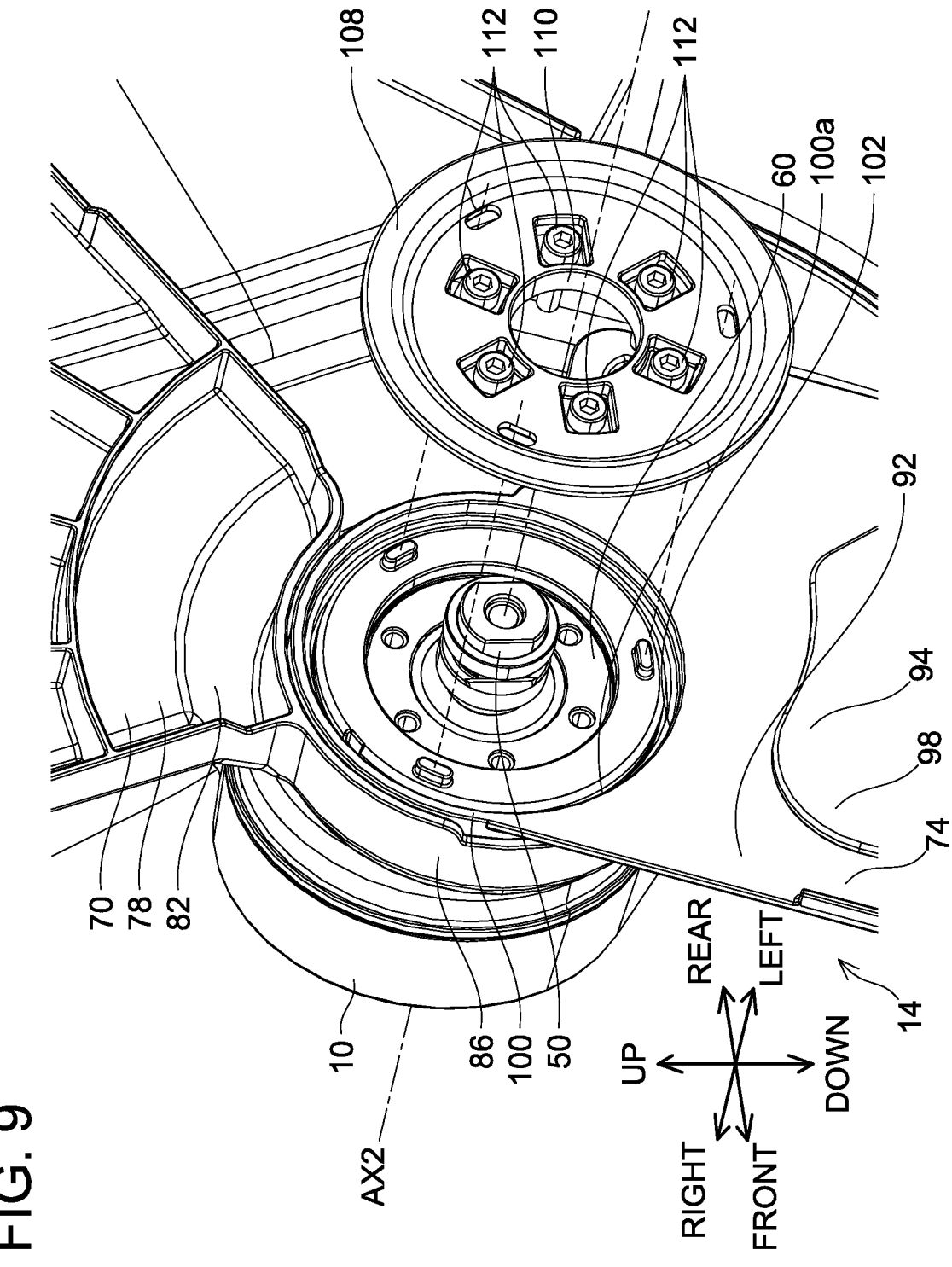

FIG. 9 is an exploded perspective view of the working machine 2 according to the first embodiment, in the vicinity of a bracket 108.

Figure 10:
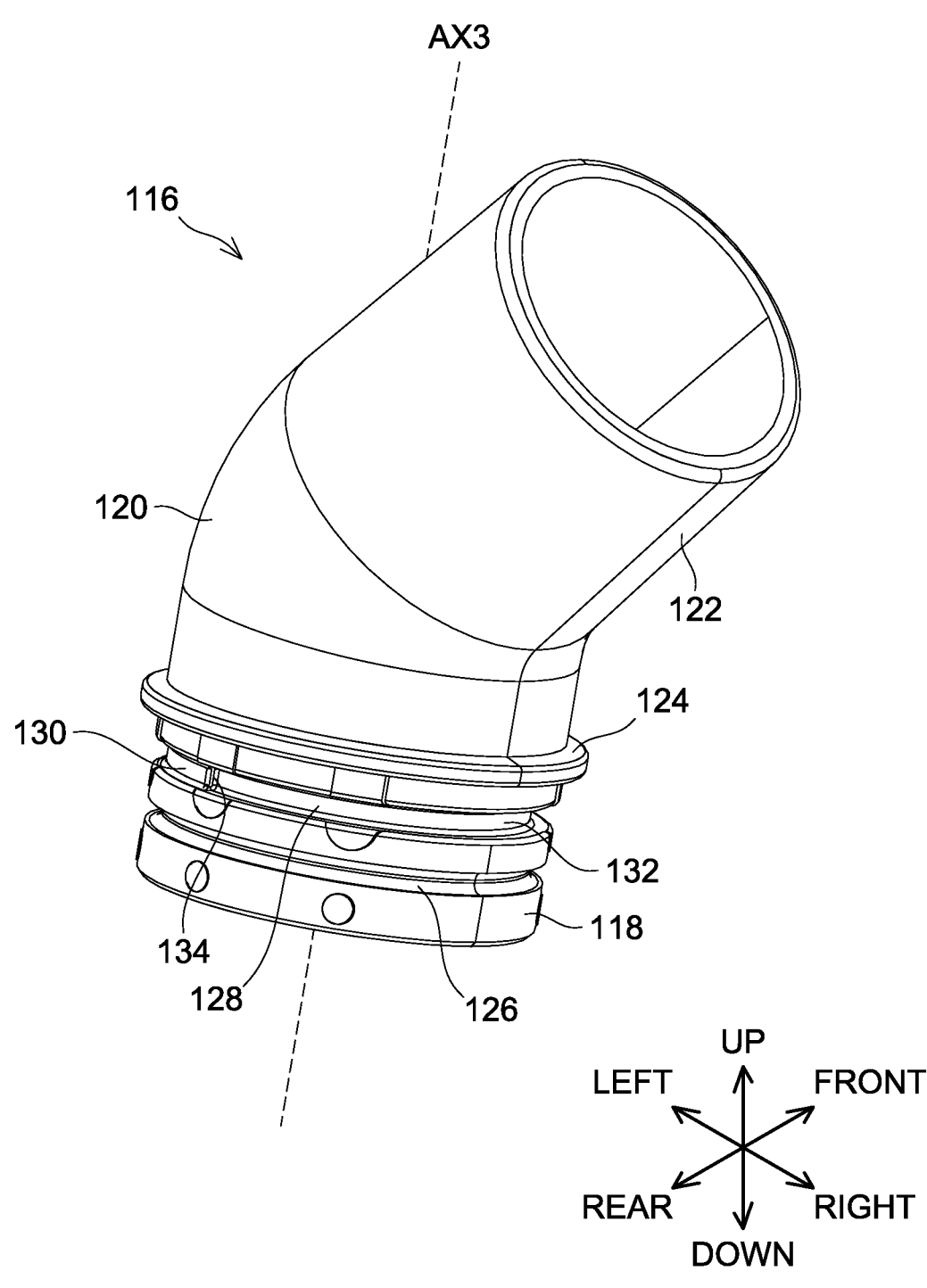

FIG. 10 is a perspective view of an attachment pipe 116 according to the first embodiment.

Figure 11:
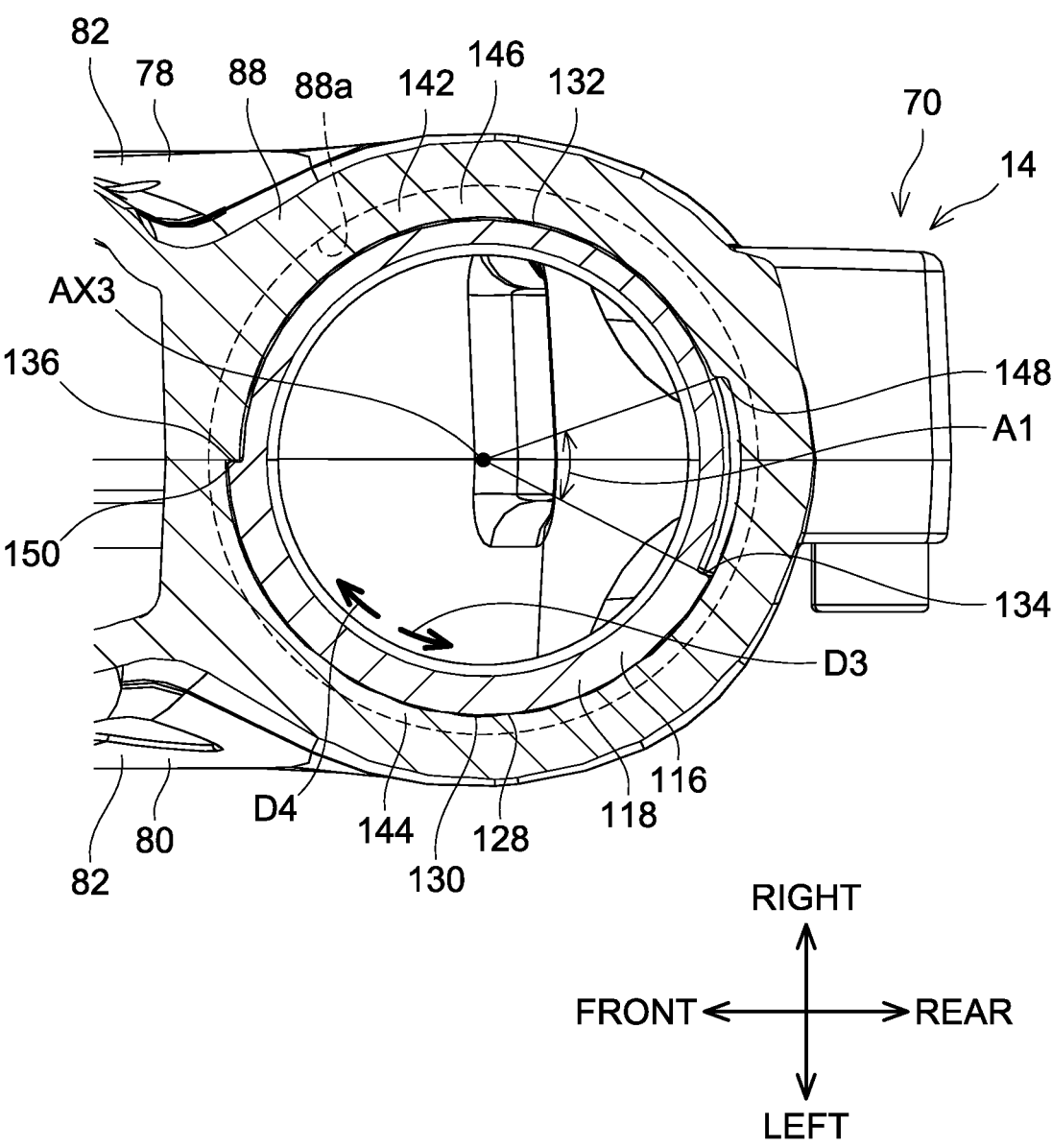

FIG. 11 is an upper cross-sectional view of the cover unit 14 according to the first embodiment, in the vicinity of the attachment pipe 116.

Figure 12:
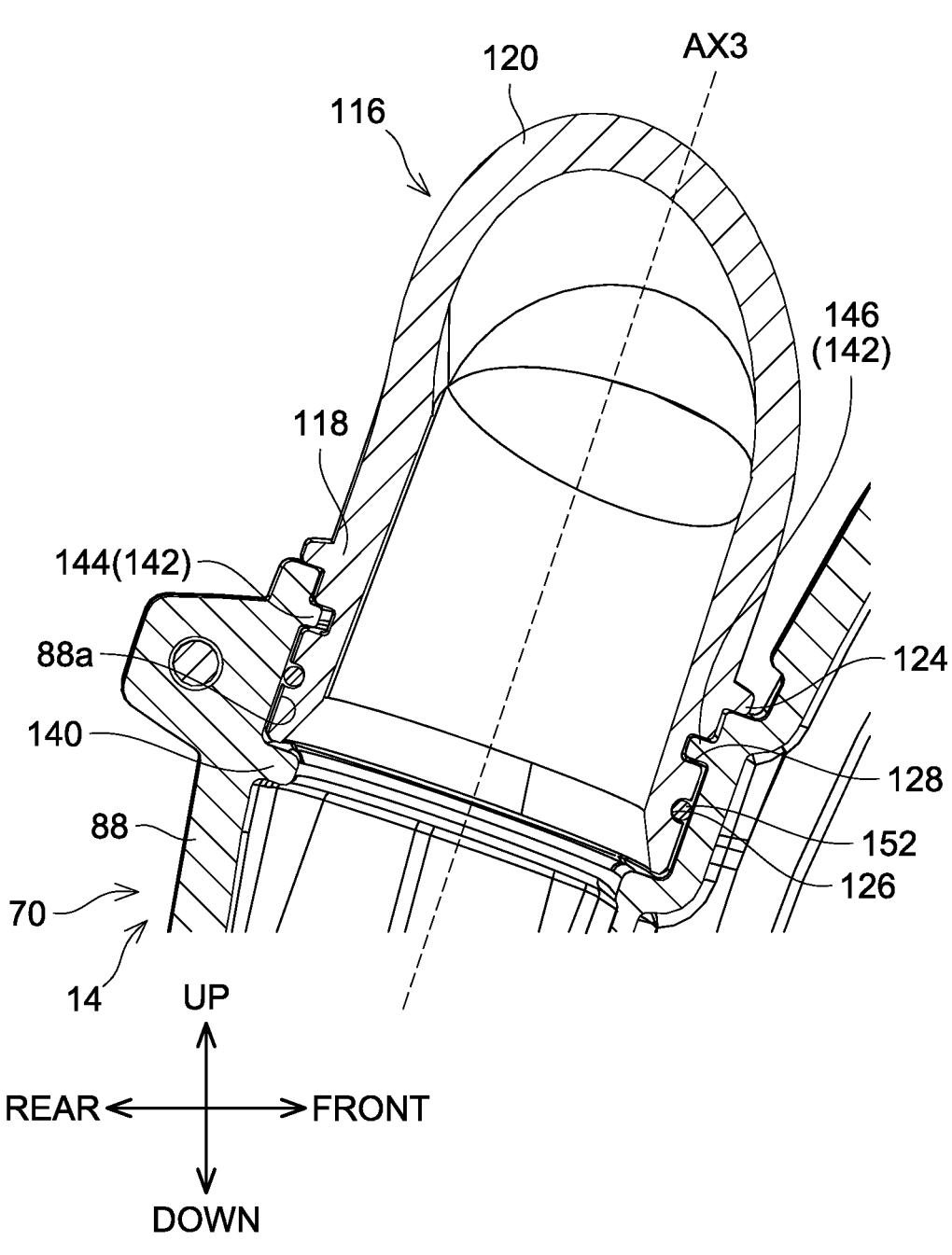

FIG. 12 is a cross-sectional view of the cover unit 14 according to the first embodiment, in the vicinity of the attachment pipe 116.

Figure 13:
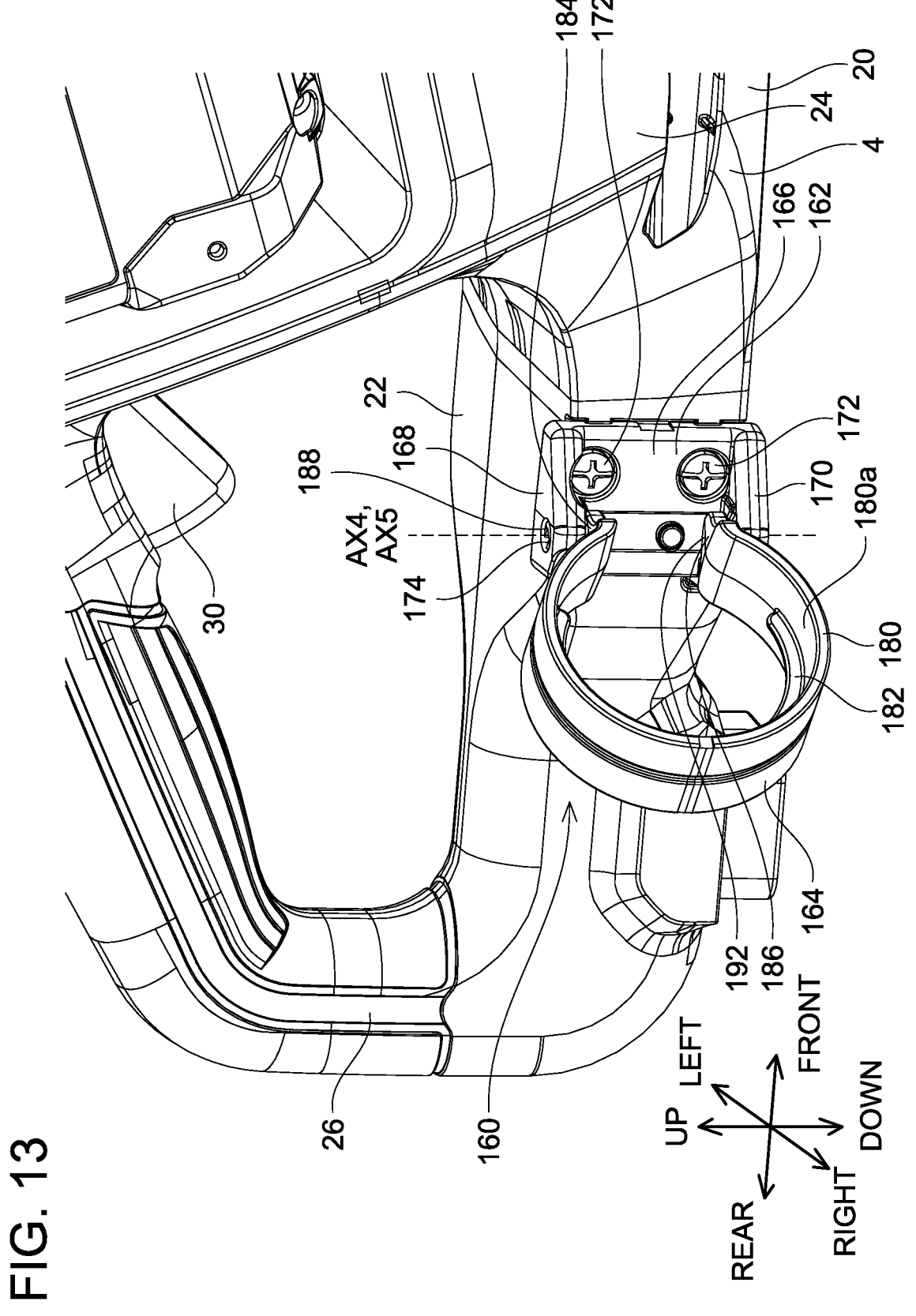

FIG. 13 is a perspective view of the working machine 2 according to the first embodiment, in the vicinity of a holding unit 160.

Figure 14:
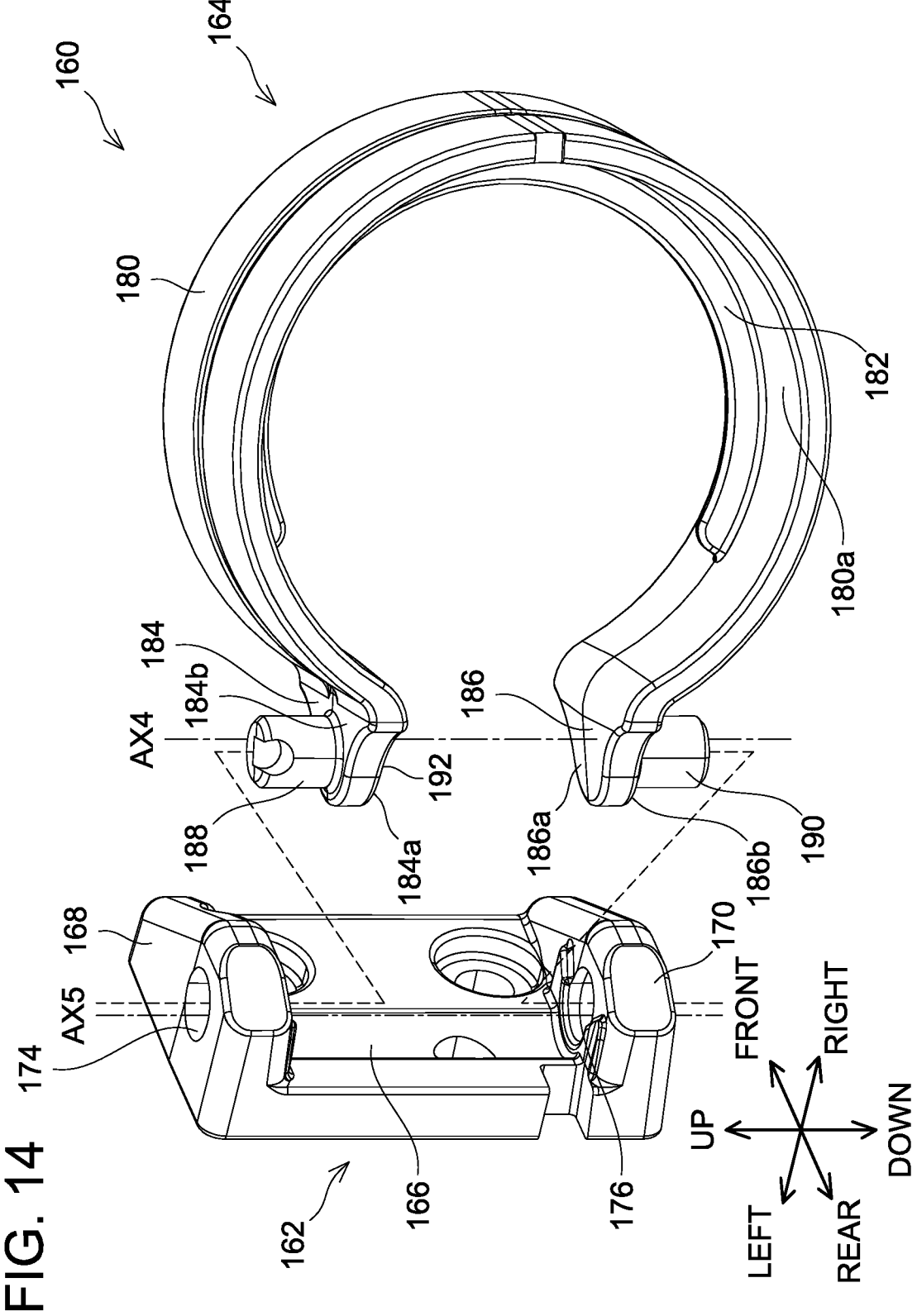

FIG. 14 is an exploded perspective view of the holding unit 160 according to the first embodiment.

Figure 15:
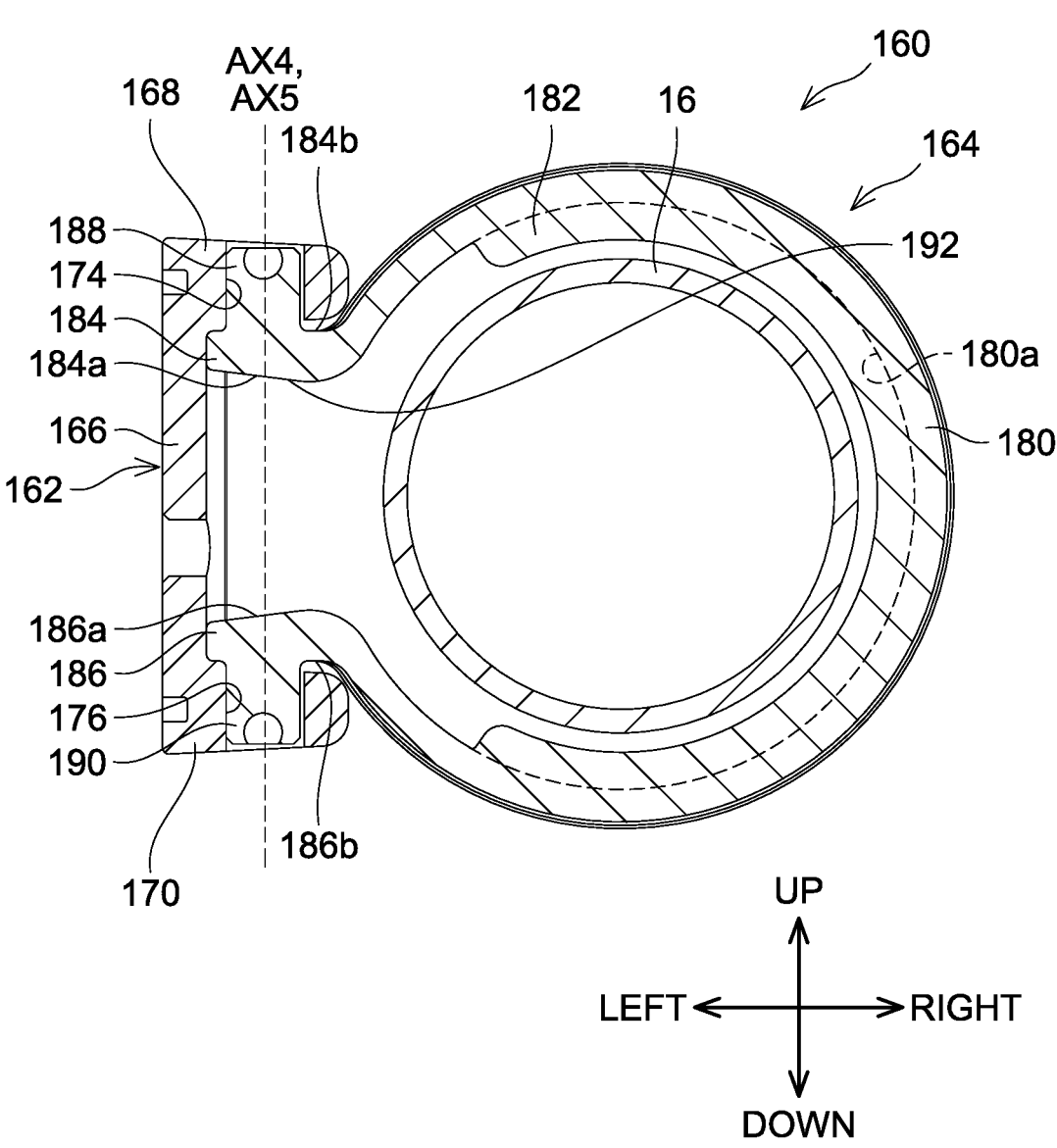

FIG. 15 is a cross-sectional view of a dust collecting hose 16 and the holding unit 160 according to the first embodiment.

Figure 16:
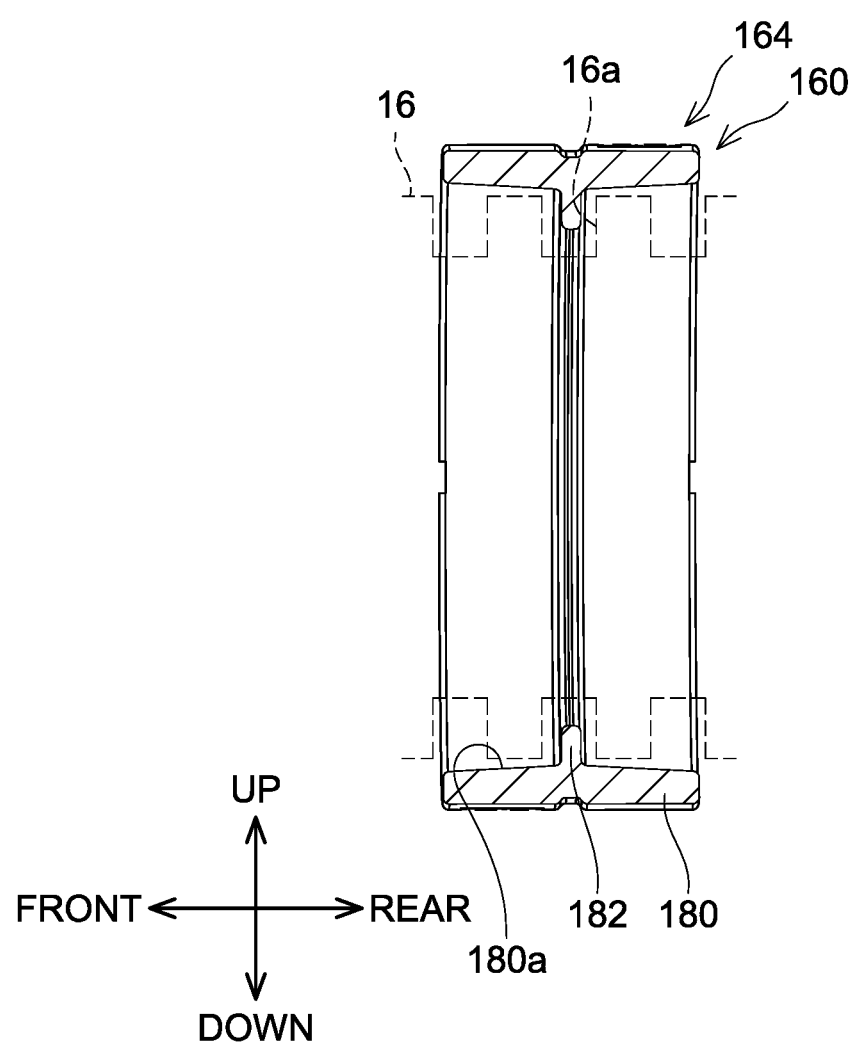

FIG. 16 is a cross-sectional view of a hose holding member 164 according to the first embodiment.

Figure 17:
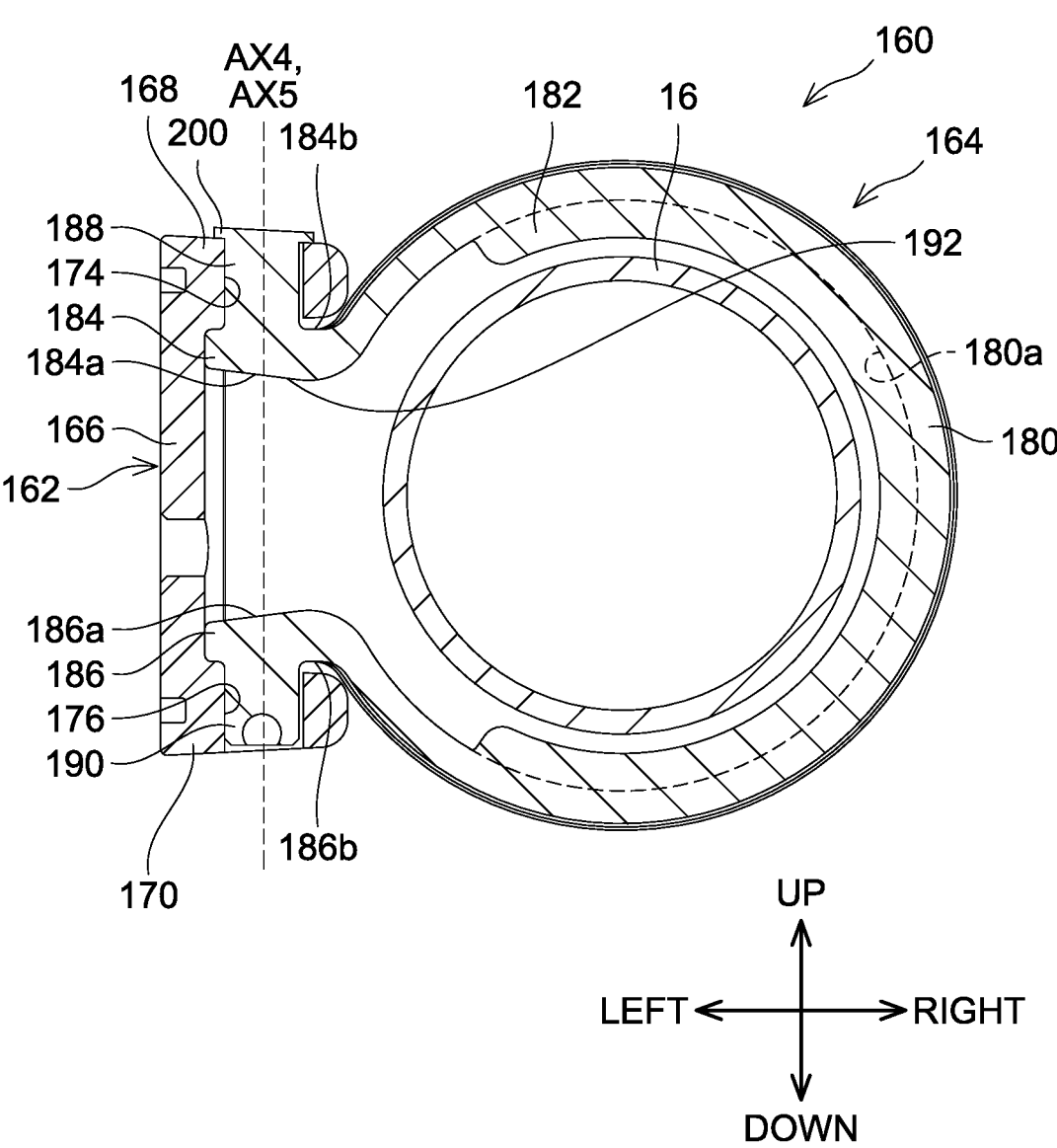

FIG. 17 is a cross-sectional view of a dust collecting hose 16 and a holding unit 160 according to a second embodiment.

Figure 18:
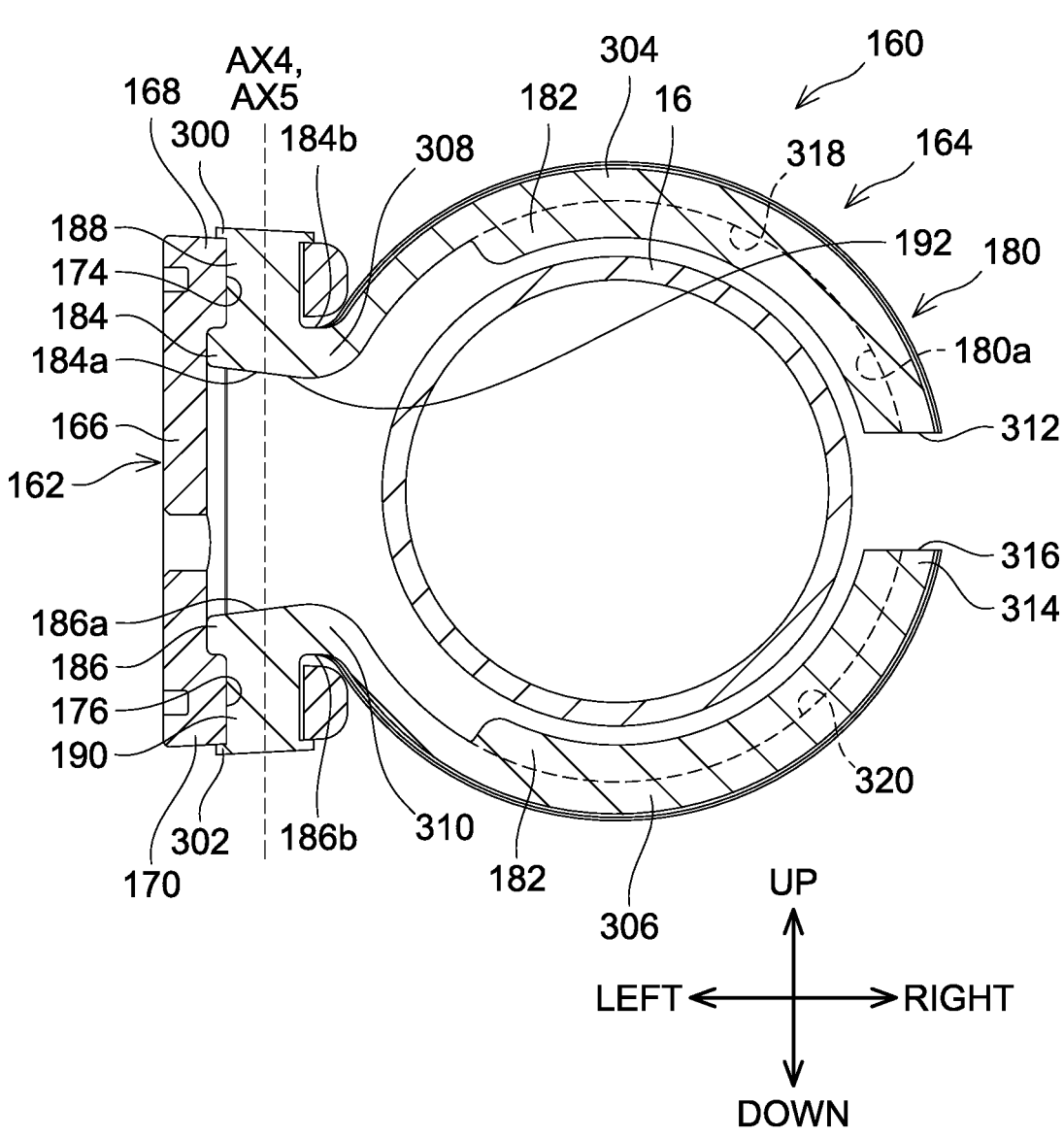

FIG. 18 is a cross-sectional view of a dust collecting hose 16 and a holding unit 160 according to a third embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the hose holding member may comprise a band surrounding an outer surface of the dust collecting hose. In a state where the hose holding member is attached to the housing, an opening of the band may be closed such that the dust collecting hose is prohibited from exiting the band across the band.

According to the configuration above, it is possible to suppress the dust collecting hose from exiting the hose holding member when the orientation of the working machine is changed. In one or more embodiments, the hose holding member may be detachably attached to the housing.

The configuration above allows the dust collecting hose to be placed within the band in the state where the hose holding member is detached from the housing and then the hose holding member to be attached to the housing. This facilitates attachment of the dust collecting hose to the hose holding member.

In one or more embodiments, the hose holding member may comprise: a band surrounding an outer surface of the dust collecting hose; and a rib protruding inward from an inner surface of the band. The rib may be configured to contact the outer surface of the dust collecting hose when the dust collecting hose is held by the hose holding member.

According to the configuration above, the rib contacts the outer surface of the dust collecting hose, and thus movement of the dust collecting hose with respect to the band can be suppressed.

In one or more embodiments, the working machine may further comprise a base fixed to the housing. The hose holding member may be attached to the housing via the base. The configuration above can reduce complexity in the shape of the housing.

In one or more embodiments, one of the hose holding member and the base may comprise a protrusion. Other of the hose holding member and the base may comprise a receiving portion configured to receive the protrusion. The hose holding member may be configured to swing about the swing axis by the protrusion rotating about a rotation axis within the receiving portion.

The configuration above allows the hose holding member to swing about the swing axis with a simple configuration.

In one or more embodiments, the swing axis is coincident with the rotation axis.

The configuration above can reduce complexity in configurations of the hose holding member and the base.

In one or more embodiments, the working machine may further comprise a shaft configured to rotate about a rotation axis by the prime mover. The cutting part may comprise a cutter fixed to the shaft and configured to cut the object by rotating about the rotation axis of the shaft. The working machine may further comprise a movable cover covering at least a part of the cutter and configured to rotate about the rotation axis of the shaft with respect to the shaft; and an attachment pipe attached to the movable cover, wherein the dust collecting hose for collecting the dust generated by the cutter cutting the object is attached to the attachment pipe. The movable cover may comprise a discharging portion extending along a rotation direction of the cutter and configured to discharge the dust to the attachment pipe. The attachment pipe may be attached to the discharging portion of the movable cover so as to rotate about a rotation axis of the attachment pipe.

According to the configuration above, the attachment pipe can rotate about the rotation axis thereof, and thus when the movable cover is rotated, interference between the dust collecting hose and the housing can be suppressed by rotating the attachment pipe.

In one or more embodiments, an upper limit of a rotation range of the attachment pipe about the rotation axis of the attachment pipe may be between 10 degrees and 90 degrees.

If the upper limit of the rotation range of the attachment pipe about the rotation axis of the attachment pipe is less than 10 degrees, the interference between the dust collecting hose and the housing may not be suppressed when the movable cover is rotated. Further, if the upper limit of the rotation range of the attachment pipe about the rotation axis of the attachment pipe is more than 90 degrees, the dust collecting hose may contact the cutter. The configuration above can suppress the interference between the dust collecting hose and the housing as well as the contact of the dust collecting hose with the cutter when the movable cover is rotated.

In one or more embodiments, one of the attachment pipe and the discharging portion may comprise a rib extending around the rotation axis of the attachment pipe. Other of the attachment pipe and the discharging portion may comprise a receiving portion configured to receive the rib such that the rib is movable around the rotation axis of the attachment pipe. The receiving portion may comprise a step configured to contact the rib around the rotation axis of the attachment pipe.

The configuration above allows the rotation range of the attachment pipe about the rotation axis thereof to be limited with a simple configuration.

FIRST EMBODIMENT

Figure 1:
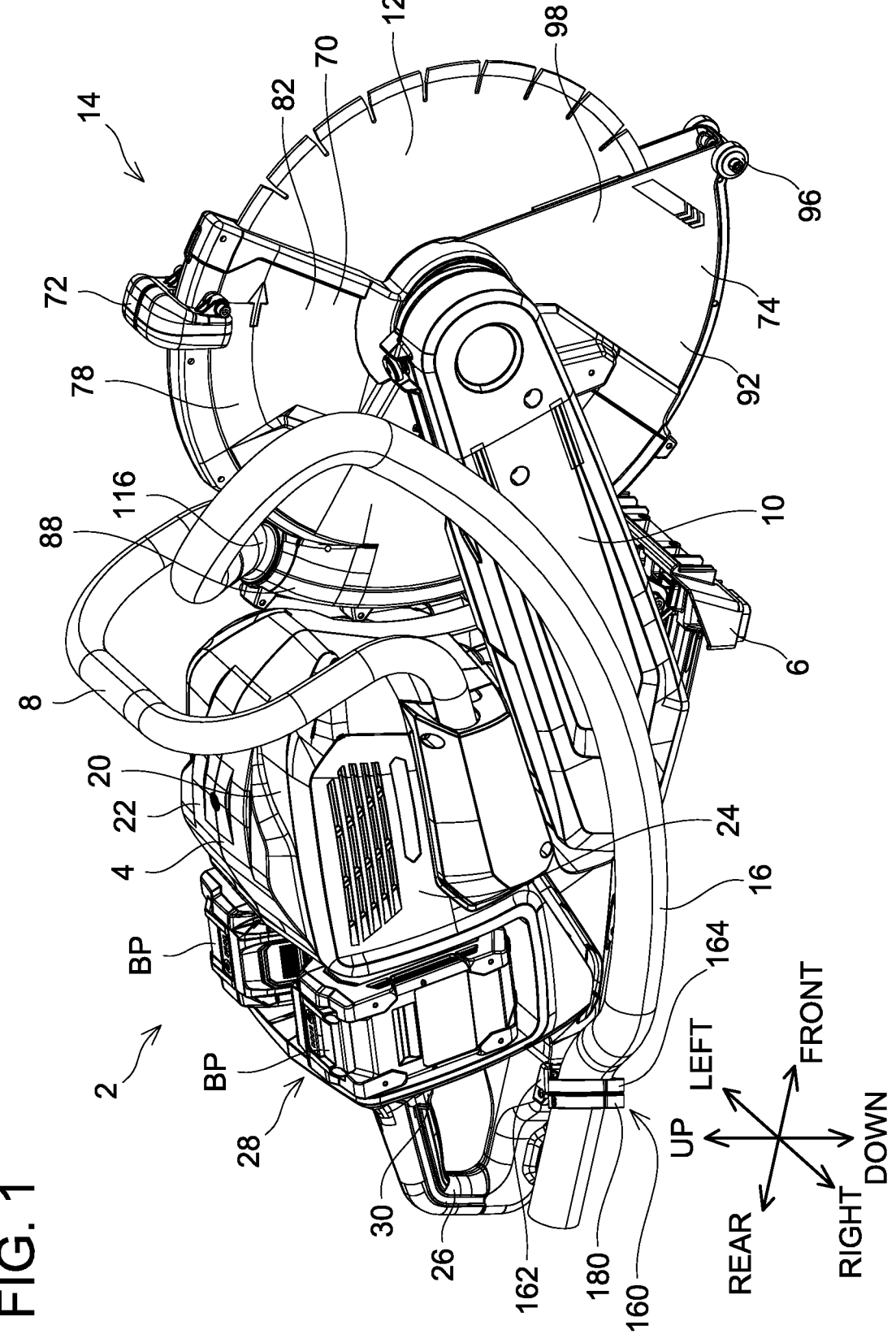
FIG. 1 is a perspective view of a working machine 2 according to a first embodiment.

As illustrated in FIG. 1, a working machine 2 is, for example, a hand-held power tool. The working machine 2 is, for example, a dry power cutter. For example, the working machine 2 is configured to cut objects such as stone materials and iron materials. The working machine 2 comprises a housing 4, a ground-contact member 6, a front handle 8, an arm 10, a cutter 12, a cover unit 14, a dust collecting hose 16, and two battery packs BP. Hereinafter, a direction which is a longitudinal direction of the working machine 2 projected to a plane P (see FIG. 2) when the working machine 2 is placed on the plane P such as the ground will be termed a front-rear direction, a direction perpendicular to the plane P will be termed as an up-down direction, and a direction perpendicular to the front-rear direction and the up-down direction will be termed a right-left direction.

The housing 4 comprises a right housing 20 defining the outer shape of a right half of the housing 4 and a left housing 22 defining the outer shape of a left half of the housing 4. The right housing 20 and the left housing 22 are fixed to each other with screws (not illustrated). The housing 4 comprises a housing body 24 and a rear handle 26.

Figure 2:
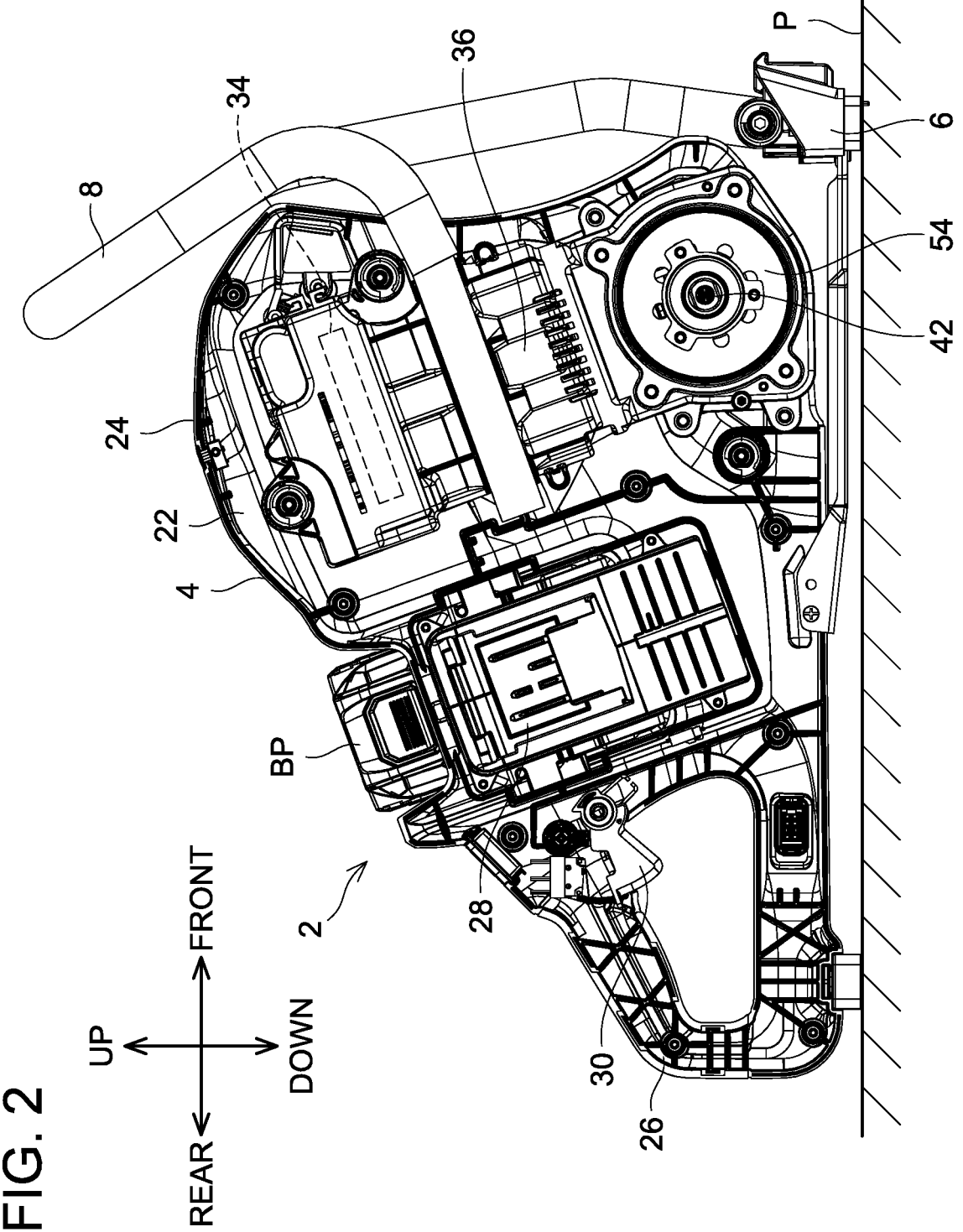
FIG. 2 is a side view illustrating an internal structure of a housing 4 of the working machine 2 according to the first embodiment.

As illustrated in FIG. 2, a battery interface 28 is located at a rear portion of the housing body 24. The battery packs BP are detachably attached to the battery interface 28 by being slid substantially in the up-down direction. The battery packs BP comprise, for example, lithium-ion batteries. As illustrated in FIG. 1, in the state where the two battery packs BP are attached to the battery interface 28, the two battery packs BP are arranged along the right-left direction with battery interface 28 interposed therebetween.

The rear handle 26 is located at a rear end of the housing body 24. The rear handle 26 extends rearward and downward from a rear surface of the housing body 24, bends to extend downward, and then bends again to extend forward up to the rear surface of the housing body 24. As illustrated in FIG. 2, a trigger 30 is attached to the rear handle 26. A user can cause a cutter 12 (see FIG. 1) to rotate by pushing the trigger 30 with finger(s) of his/her hand gripping the rear handle 26.

The ground-contact member 6 is attached to a lower end of the housing body 24. When the working machine 2 is on the plane P, the ground-contact member 6 is in contact with the plane P. Thus, a lower surface of the housing body 24 is suppressed from contacting the plane P.

As illustrated in FIGS. 1 and 2, the front handle 8 is attached to the housing body 24 and the ground-contact member 6. The front handle 8 extends to substantially above the housing body 24, bends to extend leftward, bends to extend substantially downward, and then bends again to extend rightward up to the ground-contact member 6. The user grips the front handle 8 with one hand and grips the rear handle 26 with the other hand when using the working machine 2 to cut an object.

The arm 10 is attached to a right surface of the housing body 24. The arm 10 extends from the right surface of the housing body 24 forward and upward beyond a front end of the housing body 24.

As illustrated in FIGS. 2 and 3, the working machine 2 comprises a control board 34, a prime mover 36, and a transmission unit 38. As illustrated in FIG. 2, the control board 34 and the prime mover 36 are housed in the housing body 24. In FIG. 2, the control board 34 is depicted with a broken line. The control board 34 and the prime mover 36 are located forward of the battery interface 28. The control board 34 causes the prime mover 36 to operate when the trigger is pushed. The prime mover 36 comprises, for example, an electric motor. The prime mover 36 is inclined such that its lower end is located forward of its upper end.

As illustrated in FIG. 3, the transmission unit 38 comprises a gear reducer 40, an input shaft 42, an input pulley 44, a belt 46, an output pulley 48, and an output shaft 50. The gear reducer 40 transmits rotation of a rotation shaft 36*a* of the prime mover 36 to the input shaft 42 such that the input shaft 42 rotates at a lower rotational speed than that of the rotation shaft 36*a*. The gear reducer 40 comprises a first reduction gear 52 fixed to the rotation shaft 36*a* of the prime mover 36 and a second reduction gear 54 fixed to the input shaft 42. The first reduction gear 52 and the second reduction gear 54 are, for example, bevel gears.

The input shaft 42 extends in the right-left direction. The input shaft 42 is rotatable about a rotation axis AX1 extending in the right-left direction.

The input pulley 44, the belt 46, and the output pulley 48 are housed in the arm 10 (see FIG. 1). The input pulley 44 is located near a rear end of the arm 10 (see FIG. 1). The input pulley 44 is fixed to a right end of the input shaft 42. The input pulley 44 rotates along with the input shaft 42. The belt 46 is hang onto the input pulley 44 and the output pulley 48. The belt 46 rotates the output pulley 48 by rotating in a rotation direction D1 as the input pulley 44 rotates. The output pulley 48 is located near a front end of the arm 10 (see FIG. 1).

The output shaft 50 is fixed to the output pulley 48. As illustrated in FIG. 4, the output shaft 50 extends in the right-left direction. The output shaft 50 rotates about a rotation axis AX2 extending in the right-left direction, along with the output pulley 48. The output shaft extends from the output pulley 48 and penetrates the arm 10 to protrude leftward. The output shaft 50 are rotatably supported by the arm 10 via bearings 56, 58. The arm 10 comprises, at the front end of the arm 10, a substantially cylindrical arm protrusion 60 protruding leftward from a left surface 10*a* of the arm 10, and the bearings 56, 58 are fixed to an inner surface 60*a* of the arm protrusion 60. The bearings 56, 58 are, for example, ball bearings. A right retaining member 62 and a left retaining member 64 are fixed to a left end of the output shaft 50 with a bolt 66 and a washer 68. The right retaining member 62 and the left retaining member 64 retain the cutter 12 therebetween. In this way, the cutter 12 is fixed to the left end of the output shaft 50.

As illustrated in FIG. 5, the cutter 12 is a disk-shaped blade. A plurality of cutting edges is formed along an outer circumferential edge of the cutter 12. The cutter 12 is, for example, a diamond cutter. The cutter 12 rotates about the rotation axis AX2 in a rotation direction D2 along with the output shaft 50.

The cover unit 14 is located forward of the housing body 24. The cover unit 14 partially covers the cutter 12. The cover unit 14 suppresses dust generated by the cutter 12 cutting an object from dispersing to the outside of the cover unit 14. As illustrated in FIG. 6, the cover unit 14 comprises a first movable cover 70, a cover handle 72 (see FIG. 7), and a second movable cover 74.

The first movable cover 70 comprises a first right movable cover 78 defining the outer shaft of a right half of the first movable cover 70 and a first left movable cover 80 defining the outer shape of a left half of the first movable cover 70. The cutter 12 (see FIG. 5) is interposed between the first right movable cover 78 and the first left movable cover 80.

The first movable cover 70 comprises a first covering portion 82, a first attachment portion 84, a first wall 86, and a discharging portion 88. The first covering portion 82 is formed on both the first right movable cover 78 and the first left movable cover 80. The first covering portion 82 partially covers the cutter 12 (see FIG. 5). As the first movable cover 70 is viewed in the right-left direction, the first covering portion 82 has a substantially semicircular shape.

The first attachment portion 84 and the first wall 86 is formed on the first right movable cover 78. On the first right movable cover 78, the first attachment portion 84 and the first wall 86 are located near the center of circle of the first covering portion 82. The first attachment portion 84 has a substantially cylindrical shape. The first wall 86 at least partially surrounds an outer surface 84*a* of the first attachment portion 84. A first space 90 is defined between the first wall 86 and the first attachment portion 84. As illustrated in FIG. 4, the first attachment portion 84 is slidably attached to the arm protrusion 60. The first attachment portion 84 surrounds an outer surface 60*b* of the arm protrusion 60. When the first attachment portion 84 rotates on the outer surface 60*b* of the arm protrusion 60, the first movable cover 70 rotates about the rotation axis AX2 as illustrated in FIGS. 7 and 8. The upper limit of rotation range of the first movable cover 70 about the rotation axis AX2 is between 30 degrees and 90 degrees, for example, 40 degrees. The position of the first movable cover 70 is adjusted depending on the shape and/or position of an object to be cut, etc.

As illustrated in FIG. 6, the discharging portion 88 is formed on both the first right movable cover 78 and the first left movable cover 80. As illustrated in FIG. 5, the discharging portion 88 has a curved tubular shape. The discharging portion 88 extends along the rotation direction D2 of the cutter 12. The discharging portion 88 is located radially outward of the first covering portion 82. The discharging portion 88 is for discharging dust generated by the cutter 12 cutting an object to an attachment pipe 116, which will be described later.

As illustrated in FIGS. 7 and 8, the cover handle 72 is attached to the first movable cover 70. The user can rotate the first movable cover 70 about the rotation axis AX2 by manipulating the cover handle 72 to adjust the position of the first movable cover 70. For example, the user can move the first movable cover 70 to a first position, as illustrated in FIG. 7, by pushing the cover handle 72 forward. The use can also move the first movable cover 70 to a second position, as illustrated in FIG. 8, by pulling the cover handle 72 rearward.

As illustrated in FIG. 6, the second movable cover 74 comprises a second right movable cover 92 defining the outer shape of a right half of the second movable cover 74, a second left movable cover 94 defining the outer shape of a left half of the second movable cover 74, and a roller 96 attached to the second right movable cover 92 and the second left movable cover 94. The second right movable cover 92 and the second left movable cover 94 are interposed between the first right movable cover 78 and the first left movable cover 80. The cutter 12 (see FIG. 5) is interposed between the second right movable cover 92 and the second left movable cover 94. The roller 96 is located outside of the first movable cover 70. The roller 96 rotates, for example, when contacting an object to be cut. The working machine 2 (see FIG. 7) can be thereby moved smoothly.

The second movable cover 74 comprises a second covering portion 98 and a second attachment portion 100. The second covering portion 98 is formed on both the second right movable cover 92 and the second left movable cover 94. The second covering portion 98 partially covers the cutter 12 (see FIG. 5). The second covering portion 98 can be housed in the first covering portion 82.

The second attachment portion 100 is formed on the second right movable cover 92. The second attachment portion 100 is connected to the second covering portion 98 on the second right movable cover 92. The second attachment portion 100 has a substantially cylindrical shape. An opening 102 is defined by an inner surface 100a of the second attachment portion 100. As illustrated in FIG. 4, the second attachment portion 100 is rotatably attached to the first attachment portion 84 via a bearing 104. The bearing 104 is, for example, a ball bearing. In a variant, the bearing 104 may be a slide bearing. The bearing 104 is interposed between the outer surface 84a of the first attachment portion 84 and the inner surface 100a of the second attachment portion 100. The second attachment portion 100 surrounds the outer surface 84a of the first attachment portion 84. The second attachment portion 100 is located in the first space 90 between the first attachment portion 84 and the first wall 86. When the second attachment portion 100 rotates on the outer surface 84a of the first attachment portion 84, the second movable cover 74 rotates about the rotation axis AX2 as illustrated in FIGS. 7 and 8. The rotation axis of the second movable cover 74 is coincident with the rotation axis of the first movable cover 70.

The upper limit of rotation range of the second movable cover 74 about the rotation axis AX2 is between 30 degrees and 90 degrees, for example, 45 degrees. The position of the second movable cover 74 is adjusted by the user manipulating the second movable cover 74, for example, directly grabbing the second covering portion 98 with a hand. The second movable cover 74 rotates between a drawn position (see FIG. 7) and a housed position (see FIG. 8) with respect to the first movable cover 70. As illustrated in FIG. 7, when the second movable cover 74 is at the drawn position with respect to the first movable cover 70, most of the second covering portion 98 is drawn out of the first covering portion 82. The second covering portion 98 covers partially covers an area of the cutter 12 that is not surrounded by the first covering portion 82. As illustrated in FIG. 8, when the second movable cover 74 is at the housed position with respect to the first movable cover 70, most of the second covering portion 98 is housed in the first covering portion 82. Thus, although the cutter 12 is covered by the first movable cover 70 and the second movable cover 74, the covered area of the cutter 12 corresponds to the area of the cutter 12 that the first movable cover 70 covers.

As illustrated in FIG. 9, the cover unit 14 further comprises a bracket 108. The bracket 108 has a substantially circular disk shape with an opening 110 at the center. The bracket 108 is fixed to a left surface of the arm protrusion 60 with screws 112. As illustrated in FIG. 4, the bracket 108 is interposed between the cutter 12 and the arm protrusion 60 in the right-left direction. The first attachment portion 84, the first wall 86, and the second attachment portion 100 are interposed between the left surface 10a of the arm 10 and the bracket 108. In this way, the first movable cover 70 and the second movable cover 74 are attached to the arm 10. The output shaft 50 is inserted in the opening 110. The diameter of the bracket 108 is larger than each of the diameter of the outer surface 84a of the first attachment portion 84, the diameter of the inner surface 100a of the second attachment portion 100 (the diameter of the opening 102), and the diameter of inner surface of the first wall 86. In the right-left direction, the bracket 108 overlaps the first attachment portion 84, the second attachment portion 100, and the first wall 86. Thus, the bracket 108 closes the first space 90 between the first attachment portion 84 and the first wall 86 from the left. The bracket 108 suppresses dust generated by the cutter 12 cutting an object from entering the first space 90, for example, a space between the first attachment portion 84 and the second attachment portion 100 and/or a space between the second attachment portion 100 and the first wall 86. This suppresses the dust from entering the bearing 104 and thus avoids the second movable cover 74 being unable to be rotated with respect to the first movable cover 70.

As illustrated in FIG. 6, the cover unit 14 further comprises an attachment pipe 116. For example, the attachment pipe 116 is constituted of a resin material. In a variant, the attachment pipe 116 may be constituted of a metal material. The attachment pipe 116 is attached to the discharging portion 88 so as to be rotatable about a rotation axis AX3 by being interposed between the first right movable cover 78 and the first left movable cover 80. The rotation axis AX3 is skew with respect to the rotation axis AX2. The attachment pipe 116 is detachably attached to the dust collecting hose 16 (see FIG. 7). The attachment pipe 116 has a curved tubular shape. Since the attachment pipe 116 is rotatable, the user can rotate the attachment pipe 116 to a predetermined position, which facilitates the attachment of the dust collecting hose 16 to the attachment pipe 116. The attachment pipe 116 is for conveying dust discharged from the discharging portion 88 to the dust collecting hose 16. The dust conveyed to the dust collecting hose 16 is gathered into a dust collector, which is not illustrated.

As illustrated in FIG. 10, the attachment pipe 116 comprises a cover attachment portion 118, a curved portion 120, and a hose attachment portion 122. The cover attachment portion 118 extends along the rotation axis AX3. The cover attachment portion 118 is attached to the discharging portion 88 (see FIG. 6). The curved portion 120 extends in a curved manner. The curved portion 120 connects the cover attachment portion 118 to the hose attachment portion 122. The hose attachment portion 122 extends linearly. The hose attachment portion 122 is inclined with respect to the rotation axis AX3. The hose attachment portion 122 is attached to the dust collecting hose 16 (see FIG. 1) by the dust collecting hose 16 being inserted to the hose attachment portion 122. The dust collecting hose 16 is detachably attached to the hose attachment portion 122. When the dust collecting hose 16 is not attached to the hose attachment portion 122, a cap, which is not illustrated, is attached to the hose attachment portion 122. Discharge of dust from the hose attachment portion 122 is suppressed with the cap attached to the hose attachment portion 122.

The cover attachment portion 118 comprises a flange 124, a first receiving portion 126, and a second receiving portion 128. The flange 124 is located near the connection between the cover attachment portion 118 and the curved portion 120. The flange 124 protrudes outward from an outer surface of the cover attachment portion 118. The flange 124 extends on the outer surface of the cover attachment portion 118 to completely surround the outer surface around the rotation axis AX3. The first receiving portion 126 is recessed inward from the outer surface of the cover attachment portion 118. The first receiving portion 126 extends on the outer surface of the cover attachment portion 118 to completely surround the outer surface around the rotation axis AX3

The second receiving portion 128 is interposed between the flange 124 and the first receiving portion 126. The second receiving portion 128 extends on the outer surface of the cover attachment portion 118 to completely surround the outer surface around the rotation axis AX3. The second receiving portion 128 comprises a first partial receiving portion 130 that is recessed inward by a first depth from the outer surface of the cover attachment portion 118 and a second partial receiving portion 132 that is recessed inward by a second depth from the outer surface of the cover attachment portion 118. One end of the first partial receiving portion 130 around the rotation axis AX3 is connected to one end of the second partial receiving portion 132 around the rotation axis AX3, and the other end of the first partial receiving portion 130 around the rotation axis AX3 is connected to the other end of the second partial receiving portion 132 around the rotation axis AX3. The first depth is smaller than the second depth. As illustrated in FIG. 11, a first step 134 is formed at the connection between the one end of the first partial receiving portion 130 and the one end of the second partial receiving portion 132, and a second step 136 is formed at the connection between the other end of the first partial receiving portion 130 and the second partial receiving portion 132.

Before explaining how the attachment pipe 116 is attached to the discharging portion 88, the discharging portion 88 is described in detail. As illustrated in FIG. 12, the discharging portion 88 comprises a stopper 140 and a rib 142. The stopper 140 and the rib 142 are located at an outlet 88*a* of the discharging portion 88. The stopper 140 protrudes radially inward from an inner surface of the discharging portion 88. The stopper 140 extends on the inner surface of the discharging portion 88 fully encircling around the rotation axis AX3.

The rib 142 is located closer to an upper end of the outlet 88*a* of the discharging portion 88 than the stopper 140 is. The rib 142 extends on the inner surface of the discharging portion 88 fully encircling around the rotation axis AX3. As illustrated in FIG. 11, the rib 142 comprises a first partial rib 144 that protrudes radially inward by a first height from the inner surface of the discharging portion 88 and a second partial rib 146 that protrudes radially inward by a second height from the inner surface of the discharging portion 88. In FIG. 11, the inner surface of the discharging portion 88 is depicted with a broken line. One end of the first partial rib 144 around the rotation axis AX3 is connected to one end of the second partial rib 146 around the rotation axis AX3, and the other end of the first partial rib 144 around the rotation axis AX3 is connected to the other end of the second partial rib 146 around the rotation axis AX3. The first height is smaller than the second height. A first rib step 148 is formed at the connection between the one end of the first partial rib 144 and the one end of the second partial rib 146, and a second rib step 150 is formed at the connection between the other end of the first partial rib 144 and the other end of the second partial rib 146.

As illustrated in FIG. 12, in the state where the attachment pipe 116 is attached to the discharging portion 88, the cover attachment portion 118 is inserted in the discharging portion 88. The flange 124 is in contact with the outlet 88*a* of the discharging portion 88 from outside of the discharging portion 88. An end of the cover attachment portion 118 faces the stopper 140. An 152 is attached to the first receiving portion 126, and the O-ring 152 provides sealing between the outer surface of the cover attachment portion 118 and the inner surface of the discharging portion 88. The rib 142 is received in the second receiving portion 128. In this way, removal of the attachment pipe 116 from the discharging portion 88 is suppressed. As illustrated in FIG. 11, the rib 142 can move about the rotation axis AX3 within the second receiving portion 128. When the rib 142 moves in a forward direction D3 within the second receiving portion 128 and the first step 134 contacts the first rib step 148, the rib 142 cannot move in the forward direction D3 any further within the second receiving portion 128. When the rib 142 moves in a reverse direction D4, which is opposite to the forward direction D3, within the second receiving portion 128 and the second step 136 contacts the second rib step 150, the rib 142 cannot move in the reverse direction D4 any further within the second receiving portion 128. In this way, the rotation of the attachment pipe 116 about the rotation axis AX3 is limited.

The upper limit of a rotation range A1 of the attachment pipe 116 about the rotation axis AX3 is, for example, equal to more than 10 degrees, equal to or more than 20 degrees, equal to or more than 30 degrees, or equal to or more than 40 degrees. This suppresses interference between the housing 4 (see FIG. 1) and the dust collecting hose 16 (see FIG. 1) connected to the attachment pipe 116. If the upper limit of the rotation range A1 of the attachment pipe 116 about the rotation axis AX3 is equal to or more than 30 degrees, the interference between the housing 4 and the dust collecting hose 16 is further suppressed. The upper limit of the rotation range A1 of the attachment pipe 116 about the rotation axis AX3 is, for example, equal to or less than 90 degrees, equal to or less than 80 degrees, equal to pr less than 70 degrees, or equal to or less than degrees. This suppresses the dust collecting hose 16 from contacting the cutter 12 (see FIG. 1). If the upper limit of the rotation range A1 of the attachment pipe 116 about the rotation axis AX3 is equal to or less than 70 degrees, the dust collecting hose 16 is further suppressed from contacting the cutter 12.

When the first step 134 is in contact with the first rib step 148, the attachment pipe 116 faces forward with respect to the first movable cover 70 with the hose attachment portion 122 facing forward as illustrated in FIG. 8, whereas when the second step 136 is in contact with the second rib step 150, the attachment pipe 116 faces rearward with respect to the first movable cover with the hose attachment portion 122 facing rearward as illustrated in FIG. 7. As illustrated in FIG. 8, when the attachment pipe 116 faces forward with respect to the first movable cover 70, the housing 4 and the dust collecting hose 16 are less likely to interfere with each other even with the first movable cover 70 at the second position. Further, as illustrated in FIG. 7, when the attachment pipe 116 faces rearward with respect to the first movable cover 70, the dust collecting hose 16 is less likely to contact the cutter 12 even with the first movable cover 70 at the first position.

As illustrated in FIG. 13, the working machine 2 further comprises a holding unit 160 in order to prevent the dust collecting hose 16 (see FIG. 1) from being distanced away from the housing 4 during use of the working machine 2. The holding unit 160 holds the dust collecting hose 16. The holding unit 160 is located near a rear end of the housing 4. The holding unit 160 is located on a right surface of the housing 4. This prevents the user from contacting the dust collecting hose 16 while the user is using the working machine 2 standing on the left side of the working machine 2.

The holding unit 160 comprises a base 162 and a hose holding member 164. The base 162 is constituted of a resin material. In a variant, the base 162 may be constituted of a metal material. The base 162 comprises a bottom wall 166 and a pair of opposite walls 168, 170. Hereinafter, the pair of opposite walls 168, 170 may be individually referred to as an upper opposite wall 168 and a lower opposite wall 170. The bottom wall 166 is fixed to the housing 4 with screws 172.

As illustrated in FIG. 14, the upper opposite wall 168 protrudes from an upper end of the bottom wall 166 in a direction perpendicular to the bottom wall 166 (rightward). The lower opposite wall 170 protrudes from a lower end of the bottom wall 166 in the direction perpendicular to the bottom wall 166 (rightward). The opposite walls 168, 170 are opposing in the up-down direction. The upper opposite wall 168 includes an upper receiving portion 174 that penetrates the upper opposite wall 168 in its thickness direction (in the up-down direction). The lower opposite wall 170 includes a lower receiving portion 176 that penetrates the lower opposite wall 170 in its thickness direction (in the up-down direction). The upper receiving portion 174 is located to face the lower receiving portion 176 in the up-down direction. The upper receiving portion 174 and the lower receiving portion 176 are on a rotation axis AX4 extending in the up-down direction.

The hose holding member 164 is constituted of a resin material. In a variant, the hose holding member 164 may be constituted of a metal material. The hose holding member 164 is detachably attached to the base 162. The hose holding member 164 comprises a band 180, a rib 182, an upper connecting portion 184, a lower connecting portion 186, an upper protrusion 188, and a lower protrusion 190. The band 180 has a partially interrupted ring shape. A longitudinal end of the band 180 is spaced apart from the other longitudinal end of the band 180. As illustrated in FIG. 15, the band 180 surrounds an outer surface of the dust collecting hose 16. The band 180 holds the dust collecting hose 16. The band 180 is elastically deformable such that a longitudinal end of the band 180 is brought closer to the other longitudinal end of the band 180 and such that a longitudinal end of the band 180 is brought away from the other longitudinal end of the band 180.

The rib 182 protrudes radially inward by a third height from an inner surface 180a of the band 180. This increases the rigidity of the hose holding member 164. In FIG. 15, the inner surface 180a of the band 180 is depicted with a broken line. The third height is in a range from 1 mm to 10 mm, for example, 3 mm. The rib 182 extends in the longitudinal direction of the band 180. As illustrated in FIG. 16, the rib 182 is located at the center position of the band 180 in its width direction (in the front-rear direction). The width of the rib 182 in the front-rear direction is in a range from 1 mm to 5 mm, for example, 2 mm. The rib 182 is configured to contact the outer surface of the dust collecting hose 16. By the rib 182 contacting the outer surface of the dust collecting hose 16, the dust collecting hose 16 is suppressed from moving with respect to the hose holding member 164. In FIG. 16, the outer surface of the dust collecting hose 16 is depicted with broken lines. In case of the dust collecting hose 16 being a bellows hose, the dust collecting hose 16 comprises a plurality of protrusions 16a arranged on the outer surface of the dust collecting hose 16 in a longitudinal direction of the dust collecting hose 16. The width of the rib 182 is less than an interval between adjacent protrusions 16a. The rib 182 is insertable to between adjacent protrusions 16a. By the rib 182 being inserted to between adjacent protrusions 16a, the dust collecting hose 16 is further suppressed from moving with respect to the hose holding member 164.

As illustrated in FIG. 15, the upper connecting portion 184 is connected to one longitudinal end of the band 180. The lower connecting portion 186 is connected to the other longitudinal end of the band 180. The upper connecting portion 184 is spaced apart from the lower connecting portion 186 in the up-down direction. The distance between the upper connecting portion 184 and the lower connecting portion 186 in the up-down direction is less than the diameter of the dust collecting hose 16. A lower surface 184a of the upper connecting portion 184 faces an upper surface 186a of the lower connecting portion 186. An attachment opening 192 is defined between the lower surface 184a of the upper connecting portion 184 and the upper surface 186a of the lower connecting portion 186.

The upper protrusion 188 and the lower protrusion 190 are on a swing axis AX5 extending in the up-down direction. The upper protrusion 188 protrudes from an upper surface 184b of the upper connecting portion 184 in a direction away from the upper connecting portion 184 (upward). The upper protrusion 188 has a substantially cylindrical shape corresponding to the upper receiving portion 174. The upper protrusion 188 is inserted into the upper receiving portion 174 from below to be received by the upper receiving portion 174. The lower protrusion 190 protrudes from a lower surface 186b of the lower connecting portion 186 in a direction away from the lower connecting portion 186 (downward). The lower protrusion 190 has a substantially cylindrical shape corresponding to the lower receiving portion 176. The lower protrusion 190 is inserted into the lower receiving portion 176 from above to be received by the lower receiving portion 176. In the state where the upper protrusion 188 is received within the upper receiving portion 174 and the lower protrusion 190 is received within the lower receiving portion 176, the attachment opening 192 is closed by the bottom wall 166 of the base 162. This suppresses the dust collecting hose 16 from exiting the band 180 through the attachment opening 192 across the band 180. Further, in the state where the upper protrusion 188 is received within the upper receiving portion 174 and the lower protrusion 190 is received within the lower receiving portion 176, the hose holding member 164 is swingable about the swing axis AX5 with respect to the base 162. Thus, when the orientation of the working machine 2 (see FIG. 13) is changed, the hose holding member 164 can swing with respect to the housing 4 (see FIG. 13) according to the orientation of the dust collecting hose 16. Therefore, a force applied from the dust collecting hose 16 to the hose holding member 164 is reduced as compared with a configuration in which the hose holding member 164 cannot move with respect to the housing 4. The swing axis AX5 is coincident with the rotation axis AX4.

Referring to FIGS. 13 and 14, how the dust collecting hose 16 is attached to the holding unit 160 is described. First, the band 180 as illustrated in FIG. 13 is grabbed by the user and compressed such that the upper connecting portion 184 and the lower connecting portion 186 approach each other. As a result, the upper protrusion 188 exits the upper receiving portion 174 and the lower protrusion 190 exits the lower receiving portion 176, and as illustrated in FIG. 14, the hose holding member 164 is detached from the base 162. Then, the dust collecting hose 16 (see FIG. 13) is pressed into the band 180 through the attachment opening 192 by the user. The band 180 is then grabbed by the user and compressed such that the upper connecting portion 184 and the lower connecting portion 186 approach each other. Finally, the upper protrusion 188 is inserted into the upper receiving portion 174 and the lower protrusion 190 is inserted into the lower receiving portion 176 by the user. In this way, as illustrated in FIG. 13, the hose holding member 164 is attached to the housing 4 via the base 162 with the dust collecting hose 16 held by the holding unit 160. In this state, as illustrated in FIG. 15, the outer surface of the dust collecting hose 16 is completely surrounded by the band 180, the upper connecting portion 184, the lower connecting portion 186, and the bottom wall 166 (housing 4).

(Effects)

The working machine 2 according to the embodiment comprises the prime mover 36, the housing 4 that houses the prime mover 36, the cutter 12 (an example of cutting part) configured to be driven by the prime mover 36 and cut an object, the dust collecting hose 16 for collecting dust generated by the cutter 12 cutting the object, and the hose holding member 164 configured to hold the dust collecting hose 16. The hose holding member 164 is attached to the housing 4 so as to be swingable about the swing axis AX5.

According to the configuration above, when the orientation of the working machine 2 is changed, the hose holding member 164 swings with respect to the housing 4, which reduces a force applied from the dust collecting hose 16 to the hose holding member 164. Thus, damage to the hose holding member 164 can be suppressed.

Further, the hose holding member 164 comprises the band 180 surrounding the outer surface of the dust collecting hose 16. In the state where the hose holding member 164 is attached to the housing 4, the opening of the band 180 is closed such that the dust collecting hose 16 is prohibited from exiting the band 180 across the band 180.

According to the configuration above, it is possible to suppress the dust collecting hose 16 from exiting the hose holding member 164 when the orientation of the working machine 2 is changed.

Further, the hose holding member 164 is detachably attached to the housing 4.

The configuration above allows the dust collecting hose 16 to be placed within the band 180 in the state where the hose holding member 164 is detached from the housing 4 and then the hose holding member 164 to be attached to the housing 4. This facilitates attachment of the dust collecting hose 16 to the hose holding member 164.

Further, the hose holding member 164 comprises the band 180 surrounding the outer surface of the dust collecting hose 16 and the rib 182 protruding inward from the inner surface 180*a* of the band 180. The rib 182 is configured to contact the outer surface of the dust collecting hose 16 when the dust collecting hose 16 is held by the hose holding member 164.

According to the configuration above, the rib 182 contacts the outer surface of the dust collecting hose 16, and thus movement of the dust collecting hose 16 with respect to the band 180 can be suppressed.

Further, the working machine 2 further comprises the base 162 fixed to the housing 4. The hose holding member 164 is attached to the housing 4 via the base 162.

The configuration above can reduce complexity in the shape of the housing 4.

Further, the hose holding member 164 comprises the upper protrusion 188 (an example of protrusion). The base 162 comprises the upper receiving portion 174 (an example of receiving portion) configured to receive the upper protrusion 188. The hose holding member 164 is configured to swing about the swing axis AX5 by the upper protrusion 188 rotating about the rotation axis AX4 within the upper receiving portion 174.

The configuration above allows the hose holding member 164 to swing about the swing axis AX5 with a simple configuration.

Further, the swing axis AX5 is coincident with the rotation axis AX4.

The configuration above can reduce complexity in configurations of the hose holding member 164 and the base 162.

Further, the working machine 2 further comprises the output shaft 50 (an example of shaft) configured to rotate about the rotation axis AX2 by the prime mover 36. The cutter 12 (an example of cutting part) is fixed to the output shaft 50 and configured to cut the object by rotating about the rotation axis AX2. The working machine 2 further comprises the first movable cover 70 (an example of movable cover) covering at least a part of the cutter 12 and configured to rotate about the rotation axis AX2 with respect to the output shaft 50; and the attachment pipe 116 attached to the first movable cover 70, wherein the dust collecting hose 16 for collecting the dust generated by the cutter 12 cutting the object is attached to the attachment pipe 116. The first movable cover 70 comprises the discharging portion 88 extending along the rotation direction D2 of the cutter 12 and configured to discharge the dust to the attachment pipe 116. The attachment pipe 116 is attached to the discharging portion 88 of the first movable cover 70 so as to rotate about the rotation axis AX3.

According to the configuration above, the attachment pipe 116 can rotate about the rotation axis AX3, and thus when the first movable cover 70 is rotated, interference between the dust collecting hose 16 and the housing 4 can be suppressed by rotating the attachment pipe 116.

Further, the upper limit of the rotation range A1 of the attachment pipe 116 about the rotation axis AX3 is between 10 degrees and 90 degrees.

If the upper limit of the rotation range A1 of the attachment pipe 116 about the rotation axis AX3 is less than 10 degrees, the interference between the dust collecting hose 16 and the housing 4 may not be suppressed when the first movable cover 70 is rotated. Further, if the upper limit of the rotation range A1 of the attachment pipe 116 about the rotation axis AX3 is more than degrees, the dust collecting hose 16 may contact the cutter 12. The configuration above can suppress the interference between the dust collecting hose 16 and the housing 4 as well as the contact of the dust collecting hose 16 with the cutter 12 when the first movable cover 70 is rotated.

Further, the discharging portion 88 comprises the rib 142 extending around the rotation axis AX3. The attachment pipe 116 comprises the second receiving portion 128 (an example of receiving portion) configured to receive the rib 142 such that the rib 142 is movable around the rotation axis AX3. The second receiving portion 128 comprises the first step 134 and the second step 136 (an example of step) configured to contact the rib 142 around the rotation axis AX3.

The configuration above allows the rotation range A1 of the attachment pipe 116 about the rotation axis AX3 to be limited with a simple configuration.

SECOND EMBODIMENT

Referring to FIG. 17, a second embodiment is described. For the second embodiment, only differences from the first embodiment are described. In the second embodiment, the configuration of the hose holding member 164 is different from that of the first embodiment. In the second embodiment, a stopper 200 is connected to an upper end of the upper protrusion 188. The stopper 200 suppresses the upper protrusion 188 from exiting the upper receiving portion 174. That is, a longitudinal end of the hose holding member 164 is fixed to the base 162 and the other longitudinal end of the hose holding member 164 is detachably attached to the base 162. This prevents losing the hose holding member 164. In a variant, the stopper 200 may be connected to a lower end of the lower protrusion 190 and suppress the lower protrusion 190 from exiting the lower receiving portion 176.

Upon attachment of the dust collecting hose 16 to the holding unit 160, the band 180 is grabbed by the user and compressed such that the upper connecting portion 184 and the lower connecting portion 186 approach each other. As a result, the lower protrusion 190 exits the lower receiving portion 176 and the other longitudinal end of the hose holding member 164 is thereby detached from the base 162. Then, the dust collecting hose 16 is pressed into the band 180 through the attachment opening 192 by the user. The band 180 is then grabbed by the user and compressed such that the upper connecting portion 184 and the lower connecting portion 186 approach each other. Finally, the lower protrusion 190 is inserted into the lower receiving portion 176 by the user. In this way, the hose holding member 164 is attached to the housing 4 via the base 162 with the dust collecting hose 16 held by the holding unit 160.

THIRD EMBODIMENT

Referring to FIG. 18, a third embodiment is described. For the third embodiment, only differences from the first embodiment are described. In the third embodiment, the configuration of the hose holding member 164 is different from that of the first embodiment. In the third embodiment, an upper stopper 300 is connected to an upper end of the upper protrusion 188. The upper stopper 300 suppresses the upper protrusion 188 from exiting the upper receiving portion 174. A lower stopper 302 is connected to a lower end of the lower protrusion 190. The lower stopper 302 suppresses the lower protrusion 190 from exiting the lower receiving portion 176. That is, the hose holding member 164 is fixed to the base 162. This prevents losing the hose holding member 164.

The band 180 comprises an upper band 304 and a lower band 306. The upper band 304 is spaced apart from the lower band 306 in the up-down direction. The upper band 304 is not connected to the lower band 306. That is, the hose holding member 164 is a two-part component. An end 308 of the upper band 304 is connected to the upper connecting portion 184. An end 310 of the lower band 306 is connected to the lower connecting portion 186. An attachment opening 316 is defined between the other end 312 of the upper band 304 and the other end 314 of the lower band 306. The rib 182 is formed on each of an inner surface 318 of the upper band 304 and an inner surface 320 of the lower band 306.

Upon attachment of the dust collecting hose 16 to the holding unit 160, the dust collecting hose 16 is pressed into between the upper band 304 and the lower band 306 through the attachment opening 316 by the user. In this way, the dust collecting hose 16 is held by the holding unit 160. When the dust collecting hose 16 moves with respect to the housing 4 (see FIG. 13) in this state, the hose holding member 164 swings about the swing axis AX5. The orientation of the hose holding member 164 is adjusted along with the movement of the dust collecting hose 16. Thus, it is possible to suppress the dust collecting hose 16 from exiting the hose holding member 164 through the attachment opening 316 across the band 180.

(Variants)

In one embodiment, the working machine 2 may be a concrete chainsaw or a grinder.

In one embodiment, the prime mover 36 may be an engine.

In one embodiment, the working machine 2 may comprise a power cable instead of the battery packs BP. In this instance, electric power is supplied to the prime mover 36 by connecting the power cable to an external power source.

The position of the holding unit 160 is not limited to the right surface of the housing 4. In one embodiment, the holding unit 160 may be located on a left surface of the housing 4 or on an upper surface of the housing 4. In one embodiment, the holding unit 160 may be located near a front end of the housing 4.

In one embodiment, the base 162 may be integrally formed with the housing 4.

In one embodiment, regarding the base 162 and the hose holding member 164, the upper protrusion 188 may protrude from the upper opposite wall 168 of the base 162 and the lower protrusion 190 may protrude from the lower opposite wall 170 of the base 162. In this instance, the upper receiving portion 174 is formed in the upper connecting portion 184 of the hose holding member 164 and the lower receiving portion 176 is formed in the lower connecting portion 186 of the hose holding member 164.

In one embodiment, the second receiving portion 128 may be formed in the discharging portion 88. In this instance, the rib 142 is formed on the attachment pipe 116.

What is claimed is:

1. A working machine comprising:
   a prime mover comprising a rotation shaft, wherein the prime mover includes at least one of a motor and an engine;
   a housing that houses the prime mover;
   a cutting part configured to be driven in conjunction with a rotation of the rotation shaft of the prime mover and to cut an object;
   a dust collecting hose for collecting dust generated by the cutting part cutting the object;
   a hose holding member configured to hold the dust collecting hose; and
   a base fixed to the housing,
   wherein
   the hose holding member is attached to the housing so as to be swingable about a swing axis,
   the hose holding member is attached to the housing via the base, one of the hose holding member and the base comprises a first protrusion and a second protrusion, an other of the hose holding member and the base comprises a first receiving portion into which the first protrusion is inserted and a second receiving portion into which the second protrusion is inserted, the first protrusion and the second protrusion are on a first rotation axis, the first protrusion extends in a first direction on the first rotation axis, the second protrusion extends in a second direction opposite to the first direction on the first rotation axis, and the hose holding member is configured to swing about the swing axis by the first protrusion rotating about the first rotation axis within the first receiving portion and the second protrusion rotating about the first rotation axis within the second receiving portion.

2. The working machine according to claim 1, wherein the hose holding member comprises a band surrounding an outer surface of the dust collecting hose, and in a state where the hose holding member is attached to the housing, an opening of the band is closed such that the dust collecting hose is prohibited from exiting the band across the band.

3. The working machine according to claim 2, wherein the hose holding member is detachably attached to the housing.

4. The working machine according to claim 1, wherein the hose holding member comprises:

a band surrounding an outer surface of the dust collecting hose; and a holding member rib protruding inward from an inner surface of the band, and the holding member rib is configured to contact the outer surface of the dust collecting hose when the dust colleting hose is held by the hose holding member.

5. The working machine according to claim 1, wherein the swing axis is coincident with the first rotation axis.

6. The working machine according to claim 1, further comprising a shaft configured to rotate about a second rotation axis in conjunction with the rotation of the rotation shaft of the prime mover, wherein the cutting part comprises a cutter fixed to the shaft and configured to cut the object by rotating about the second rotation axis of the shaft, the working machine further comprises:

a movable cover covering at least a part of the cutter and configured to rotate about the second rotation axis of the shaft with respect to the shaft; and an attachment pipe attached to the movable cover, wherein the dust collecting hose for collecting the dust generated by the cutter cutting the object is attached to the attachment pipe, the movable cover comprises a discharging portion extending along a rotation direction of the cutter and configured to discharge the dust to the attachment pipe, and the attachment pipe is attached to the discharging portion of the movable cover so as to rotate about a rotation axis of the attachment pipe.

7. The working machine according to claim 6, wherein an upper limit of a rotation range of the attachment pipe about the rotation axis of the attachment pipe is between 10 degrees and 90 degrees.

8. The working machine according to claim 7, wherein one of the attachment pipe and the discharging portion comprises a discharge rib extending around the rotation axis of the attachment pipe, an other of the attachment pipe and the discharging portion comprises a receiving portion configured to receive the discharge rib such that the discharge rib is movable around the rotation axis of the attachment pipe, and the receiving portion comprises a step configured to contact the discharge rib around the rotation axis of the attachment pipe.

9. The working machine according to claim 3, wherein the hose holding member comprises a holding member rib protruding inward from an inner surface of the band, the holding member rib is configured to contact the outer surface of the dust collecting hose when the dust collecting hose is held by the hose holding member, the swing axis is coincident with the first rotation axis, the working machine further comprises a shaft configured to rotate about a second rotation axis in conjunction with the rotation of the rotation shaft of the prime mover, the cutting part comprises a cutter fixed to the shaft and configured to cut the object by rotating about the second rotation axis of the shaft, the working machine further comprises:

a movable cover covering at least a part of the cutter and configured to rotate about the second rotation axis of the shaft relative to the shaft; and an attachment pipe attached to the movable cover, wherein the dust collecting hose for collecting the dust generated by the cutter cutting the object is attached to the attachment pipe, the movable cover comprises a discharging portion extending along a rotation direction of the cutter and configured to discharge the dust to the attachment pipe, the attachment pipe is attached to the discharging portion of the movable cover so as to rotate about a rotation axis of the attachment pipe, an upper limit of a rotation range of the attachment pipe about the rotation axis of the attachment pipe is between 10 degrees and 90 degrees, one of the attachment pipe and the discharging portion comprises a discharge rib extending around the rotation axis of the attachment pipe, an other of the attachment pipe and the discharging portion comprises a receiving portion configured to receive the discharge rib such that the discharge rib is movable around the rotation axis of the attachment pipe, and the receiving portion comprises a step configured to contact the discharge rib around the rotation axis of the attachment pipe.

* * * * *